(12) United States Patent
Vija et al.

(10) Patent No.: US 8,103,487 B2
(45) Date of Patent: Jan. 24, 2012

(54) CONTROLLING THE NUMBER OF ITERATIONS IN IMAGE RECONSTRUCTION

(75) Inventors: A. Hans Vija, Evanston, IL (US); Amos Yahil, Stony Brook, NY (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 959 days.

(21) Appl. No.: 11/930,985

(22) Filed: Oct. 31, 2007

(65) Prior Publication Data
US 2009/0112530 A1 Apr. 30, 2009

(51) Int. Cl.
*G06F 17/10* (2006.01)
(52) U.S. Cl. .......................................................... 703/2
(58) Field of Classification Search ...................... 703/2
See application file for complete search history.

(56) References Cited

U.S. PATENT DOCUMENTS

| | | | |
|---|---|---|---|
| 5,155,365 A | 10/1992 | Cann et al. | |
| 5,602,891 A | 2/1997 | Pearlman | |
| 5,912,993 A * | 6/1999 | Puetter et al. | 382/275 |
| 6,353,688 B1 | 3/2002 | Puetter et al. | |
| 6,399,951 B1 | 6/2002 | Paulis et al. | |
| 6,490,374 B2 | 12/2002 | Puetter et al. | |
| 6,674,083 B2 | 1/2004 | Tanaka et al. | |
| 6,895,125 B2 | 5/2005 | Puetter et al. | |
| 6,956,925 B1 | 10/2005 | Hoffman | |
| 7,180,074 B1 | 2/2007 | Crosetto | |
| 7,457,655 B2 | 11/2008 | Welch et al. | |
| 7,519,412 B2 | 4/2009 | Mistretta | |
| 7,863,574 B2 | 1/2011 | Hahn et al. | |
| 7,881,510 B2 | 2/2011 | Doyle | |
| 2006/0284095 A1 | 12/2006 | Muehllehner et al. | |
| 2008/0233546 A1 | 9/2008 | Baker et al. | |
| 2008/0270465 A1 | 10/2008 | Vija et al. | |
| 2009/0161933 A1 | 6/2009 | Chen et al. | |
| 2009/0175523 A1 | 7/2009 | Chen et al. | |
| 2009/0262996 A1 | 10/2009 | Samsonov et al. | |
| 2010/0308228 A1 | 12/2010 | Vija et al. | |

OTHER PUBLICATIONS

Puetter, R. C. (1997), Information, Language, and Pixon-Based Image Reconstruction. Annals of the New York Academy of Sciences, 808: 160-183. doi: 10.1111/j.1749-6632.1997.tb51659.x.*
Puetter et al.; Digital Image Reconstruction: Deblurring and Denoising; Annu. Rev. Astron. Astrophys. 2005. 43:139-94 doi: 10.1146/annurev.astro.43.112904.104850; First published online as a Review in Advance on Jun. 16, 2005.*
Shieh, et al., "Iterative image reconstruction using prior knowledge," J Opt Soc Am A Opt Image Sci Vis, vol. 23, No. 6, pp. 1292-1300, Jun. 2006.
Adluru, et al., "Temporally constrained reconstruction of dynamic cardiac perfusion MRI", Magn. Reson. Med., vol. 57, No. 6, pp. 1027-1036, (Jun. 2007).
Hudson, et al., "Accelerated image reconstruction using ordered subsets of projection data", IEEE Trans. Med. Imaging, vol. 13, No. 4, pp. 601-609 (1994).

(Continued)

*Primary Examiner* — Hugh Jones
(74) *Attorney, Agent, or Firm* — Peter L. Kendall

(57) ABSTRACT

An iterative reconstruction method to reconstruct an object includes determining, in a series of iteration steps, updated objects, wherein each iteration step includes determining a data model from an input object, and determining a stop-criterion of the data model on the basis of a chi-square-gamma statistic. The method further includes determining that the stop-criterion of the data model has transitioned from being outside the limitation of a preset threshold value to being inside the limitation, ending the iterations, and selecting one of the updated objects to be the reconstructed object.

10 Claims, 15 Drawing Sheets

OTHER PUBLICATIONS

Turkheimer, et al., "PET image denoising using a synergistic multi-resolution analysis of structural (MRI/CT) and functional datasets", J. Nucl. Med., 49:657-66.

Somayajula, et al. "PET image reconstruction using anatomical information through mutual information based priors." pp. 2722-2726.

Sureau, et al. "Impact of Image-Space Resolution Modeling for Studies with the High-Resolution Research Tornograph," J Nucl Med, vol. 49, No. 6, pp. 1000-1008, Jun. 1, 2008.

Alenius, et al.., "Generalization of median root prior reconstruction," IEEE Trans. Med. Imaging, vol. 21, No. 11, pp. 1413-1420, Nov. 2002.

Hsu, C.., "A prior image model with mixed continuity constraints for Bayesian PET image reconstruction," Nuclear Science Symposium, 1999, Conference Record, 1999 IEEE, vol. 3, pp. 1428-1432, Seattle, Washington, Oct. 1999.

Gindi, G., et al., "Bayesian reconstruction of functional images using anatomical information as priors", IEEE Trans. Med. Imaging, vol. 12, No. 4, pp. 670-680, 1993.

Zhenyu, et al., "Approximate maximum likelihood hyper-parameter estimation for Gibbs priors." Image Processing, IEEE Transactions on, vol. 6, No. 6, pp. 844-861, 1997.

Reutter, et al., "Direct least-squares estimation of spatiotemporal distributions from dynamic SPECT projections using a spatial segmentation and temporal B-splines," Medical Imaging, IEEE Transactions on, vol. 19, No. 5, pp. 434-450, 2000.

Parra, et al., "List-mode likelihood: EM algorithm and image quality estimation demonstrated on 2-D PET," Medical Imaging, IEEE Transactions on, vol. 17, No. 2, pp. 228-235, 1998.

Nuyts, et al., "Simultaneous maximum a posteriori reconstruction of attenuation and activity distributions from emission sinograms," Medical Imaging, IEEE Transactions on 5 vol. 18, No. 5. pp. 393-403, 1999.

Hero, et al., "Information analysis of single photon emission computed tomography with count losses", Medical Imaging 9, IEEE Transactions, pp. 117-127 (1990).

Kadrmas, et al., "Maximum a posteriori algorithm for the reconstruction of dynamic SPECT data", IEEE Nuclear Science Symposium and Medical Imaging Conference, vol. 3, pp. 2086-2089, Nov. 8-14, 1998.

LaRiviere, et al., "Nonparametric regression sonogram smoothing using a roughness-penalized Poisson likelihood objective function", IEEE Trans. Med. Imaging, vol. 19, No. 8, pp. 773-786, 2000.

Chiao, et al., "Model-based estimation for dynamic cardiac studies using ECT", IEEE Trans. Med. Imaging, vol. 13, No. 2, pp. 217-226, 1994.

Nichols, et al, "Spatiotemporal reconstruction of list-mode PET data," Medical Imaging, IEEE Transactions on, vol. 21, No. 4, pp. 396-404, 2002.

Kadrmas, et al., "4D maximum a posteriori reconstruction in dynamic SPECT using a compartmental model-based prior," Physics in Medicine and Biology, vol. 46, No. 5, pp. 1553-1574, 2001.

D. J. Kadrmas, "Statistically regulated and adaptive EM reconstruction for emission computed tomography," Nuclear Science, IEEE Transactions on, vol. 48, No. 3, pp. 790-798, 2001.

Shao, L., et al., "Information gain from count correction in SPECT image reconstruction and classification", IEEE Trans. Nucl. Science, vol. 37, No. 2, pp. 652-657, 1990.

Shieh, et al., "Image reconstruction: a unifying model for resolution enhancement and data extrapolation. Tutorial," J Opt Soc Am A Opt Image Sci Vis, vol. 23, No. 2, pp. 258-266, Feb. 2006.

Mighell, K.J., "Parameter estimation in astronomy with poisson-distributed data I. The statistic", Astrophys. J. 518, 380-393.

Wesolowski, C.A., et al., "Improved lesion detection from spatially adaptive, minimally complex Pixon® reconstruction of planar scintigraphic images", Comput. Med. Imaging Graph., 65-81.

Wernick, et al., "Emission tomography: the fundamentals of PET and SPECT", Chapters 7,11 and 21, Elsevier, Academic Press, 2004.

Galatsanos, et al., "Methods for Choosing the Regularization Parameter and Estimating the Noise Variance in Image Restoration and Their Relation", IEEE Transactions on Image Processing, vol. 1, No. 3, pp. 322-336 (Jul. 1992).

Fessler, et al., "Space-alternating generalized expectation-maximization algorithm", Signal Processing, IEEE T-SP 42 (10): 2664-77, (Oct. 1994).

Vija, et al, "Preprocessing of SPECT Projection Data: Benefits and Pitfalls", 2005 IEEE Nuclear Science Symposium Conference Record, pp. 2160-2164.

Puetter, et al., "The pixon method of image reconstruction", Astronomical Data Analysis Software and Systems VIII, Astronomical Society of the Pacific, Conference Series 1999, 172, 307-316.

Lehovich, et al., "Human observer LROC study of lesion detection in Ga-67 SPECT images reconstructed using MAP with anatomical priors", 2006 IEEE nucl., Sci. Symp. Conf. Rec., 1699-702.

Lehovich, et al., "Choosing anatomical-prior strength for MAP SPECT reconstruction to maximize lesion detectability", 2007 IEEE Nucl. Sci. Syrnp. Conf. Rec., 4222-5.

K.J. Mighell, "Parameter estimation in astronomy with Poisson-distributed data. II. The modified chi-square gamma statistic", 2000, arXiv:astro-ph/0007328.

J. Hadamard, "Sur les problèmes aux dérivées partielles et leur signification physique", Princeton Uni. Bull., 13, 49-52, (1902).

Tsui, B.M.W., et al., "Quantitative cardiac SPECT reconstruction with reduced image degradation due to patient anatomy", IEEE Trans. Nuc. Sci., 41, 2838-44, 1994.

Gorman, J.D. and Hero, A.O., "Lower bounds for parametric estimation with constraints", IEEE Trans. Information Theory, vol. 36, No. 6, pp. 1285-1301, 1990.

Siemens Medical, "Symbia SPECT Working for You", Product Information, 2007.

Haacke, et al., "Constrained reconstruction: A super-resolution, optimal signal-to-noise alternative to the Fourier transform in magnetic resonance imaging", Medical Physics, vol. 16, No. 3, pp. 388-397, 1989.

Halder, et al., "Anatomically constrained reconstruction from noisy data", Magn. Reson. Med., vol. 59, No. 4, pp. 810-818, Apr. 2008.

Rangarajan, et al., "A model-based approach for filtering and edge detection in noisy images", IEEE Trans. Circuits and Systems, vol. 37, No. 1, pp. 140-144, 1990.

Roggemann, et al., "Model-based image reconstruction by means of a constrained least-squares solution", Appl Opt, vol. 36, No. 11, pp. 2360-2369, Apr. 10, 1997.

Roy, et al., "Three-dimensional unconstrained and constrained image-reconstruction techniques applied to fluorescence, frequency-domain photon migration", Appl. Opt., vol. 40, No. 13, pp. 2206-2215, May 1, 2001.

Tapiovaara, M.J. and Wagner, R.F., "SNR and noise measurements medical imaging: I. A practical approach based on statistical decision theory", Phys. Med. Biol., vol. 38, pp. 71-92, 1993.

Hadamard, J.,"Lectures on Cauchy's Problem in Linear Partial Differential Equations", New Haven: Yale Press. Reprinted 1952. New York: Dover Publications. (Webpage print out of coverpage, synopsis and table of contents from www.bn.com).

Green, P.J. and Silverman, B.W., "Generalized Linear Models: A Roughness Penalty Approach", Chapman & Hall/CRC, 1994 (Webpage print out of coverpage, synopsis and table of contents from www.bn.com).

Puetter, "The Pixon and Bayesian Image Reconstruction", SPIE vol. 2302, Image Reconstruction and Restoration (1994), pp. 112-131.

Puetter, "Pixons and Bayesian Image Reconstruction", SPIE vol. 1946, Infrared Detectors and Instrumentation (1993), pp. 405-416.

Pina, et al, "Bayesian Image Reconstruction: The Pixon and Optimal Image Modeling", Publications of the Astronomical Society of the Pacific, 105:630-637, Jun. 1993.

* cited by examiner

CONTROLLING THE NUMBER OF ITERATIONS IN IMAGE RECONSTRUCTION

TECHNICAL FIELD

An embodiment of the invention relates to image reconstruction, and in particular, to iterative image reconstruction.

BACKGROUND

Iterative image reconstruction methods, such as non-negative least square or likelihood algorithms, iteratively fit image models to a data set and thus calculate a final image while minimizing the effect of noise to the image. An overview of different reconstruction methods is given in R. C. Puetter et al., "Digital Image Reconstruction: Deblurring and Denoising," Annu. Rev. Astro. Astrophys., 2005, 43: 139-194, the contents of which are herein incorporated by reference. One example for efficient reconstruction is a non-negative least squares fit (NNLS). Another example is an ordered subset expectation maximization algorithm (OSEM algorithm), which is described, for example, in H. M. Hudson and R. S. Larkin, "Accelerated image reconstruction using ordered subsets of projection data," IEEE Transactions on Medical Imaging, vol. 13, no. 4, pp. 601-609, 1994, the contents of which are herein incorporated by reference.

Within the OSEM algorithm, an iteration step is defined as a single pass through all the subsets, in each subset using the current estimate to initialize application of the expectation maximization with the data subset. As the OSEM algorithm does not converge and may cycle, the user typically predefines the number of iterations. If the number of iterations is set too low, the reconstruction is incomplete, i.e., a loss of resolution is retained. However, if the number is set to high, the reconstruction takes too long and may yield artifacts. Usually, the applied number of iterations is set on the basis of experimentation with the current data or according to the reconstruction of a similar data set previously processed.

SUMMARY

An embodiment of invention is based in part on the fact that a chi-square-gamma statistic can be exploited to determine when to end an iterative reconstruction.

In one aspect, an iterative reconstruction method for reconstructing an object includes determining, in a series of iteration steps, updated objects, wherein each iteration step includes determining a data model from an input object, and determining a stop-criterion of the data model on the basis of a chi-square-gamma statistic. The iterative reconstruction method further includes determining that the stop-criterion of the data model has transitioned from being outside the limitation of a preset threshold value to being inside the limitation, ending the iterations, and selecting one of the updated objects to be the reconstructed object.

In another aspect, an iterative reconstruction method for updating an input object includes determining, in a series of iteration steps, updated objects, wherein each iteration step includes determining a data model from an input object and determining the stop-criterion of the data model on the basis of a chi-square-gamma statistic. The iterative reconstruction method further includes determining that a stop-criterion of the data model has remained outside the limitation of a preset threshold value, and providing the updated object of the iteration step as input object of the next iteration.

In another aspect, a nuclear imaging device includes a detector for detecting radiation emitted from within a patient and providing a data set indicative of the detected radiation, a reconstruction unit for iteratively computing updated objects for the data set and deriving from the data set an output image object to be displayed, and an evaluation unit interacting with the reconstruction unit for controlling the number of iterations using a chi-square-gamma statistic.

Implementations may include one or more of the following features. Reconstructing the object may include selecting the input object of an iteration step to be the updated object from a preceding iteration step. Reconstructing the object may include selecting the reconstructed object from the group consisting of the updated object of a last iteration step and the updated object of a preceding iteration step.

Reconstructing the object may further include setting the stop-criterion to be the ratio of the difference between a value of the chi-square-gamma statistic and an expectation value of that chi-square-gamma value, and a standard deviation of that chi-square-gamma value, and stopping the iteration for the first iteration having a stop-criterion less than or equal to one. Alternatively, or in addition the stop-criterion may be set to be the value of the chi-square-gamma statistic, and stopping the iteration when the stop-criterion is less than or equal to the sum of the expectation value of that chi-square-gamma value and the product of an assigned factor and the standard deviation of that chi-square-gamma value.

Reconstructing the object may include calculating the value of the chi-square-gamma statistic to be a sum of ratios calculated over data points defining a data space, wherein for each data point a denominator of the ratio is a square of a modified residual, and the numerator of the ratio is the sum of a measured value of that data point and a statistical-data-offset number, and wherein the residual is the difference between a corrected measured value of that data point and a modeled value of that data point, wherein the corrected measured value is the sum of the measured value and the minimum of the measured value and one.

A region of interest may be defined within an object space, and reconstructing the object may include comprising calculating the chi-square-gamma statistic on the basis of a forward projection of the region of interest in a data space.

The iteration step may be an iteration step of an algorithm selected from the group consisting of algorithms based on maximum likelihood, algorithms based on an ordered subset expectation maximization, algorithms based on a non-negative least square fit, algorithms based on an ordered subset non-negative least square fit, and algorithms based on a pixon method.

The evaluation unit of the nuclear imaging device of may be configured to use the chi-square-gamma statistic for determining a stop-criterion of a data model that corresponds to an updated object. The reconstruction unit may be configured to provide the updated object of an iteration that directly follows the iteration that produced an output image that fulfills the quality evaluation. The reconstruction unit may be configured to provide the output image to be the second of the updated objects that fulfills the quality evaluation. The reconstruction unit of the nuclear imaging device may be configured to run an algorithm selected from the group consisting of algorithms based on maximum likelihood, algorithms based on an ordered subset expectation maximization, algorithms based on a non-negative least square fit, algorithms based on an ordered subset non-negative least square fit, and algorithms based on a pixon method.

The detector unit of the nuclear imaging device may be a positron emission tomography detector system or a single photon computed tomography detector system.

The evaluation unit of the nuclear imaging device may be configured to determine a stop-criterion of the data model within a region of interest defined in object space.

These general and specific aspects may be implemented using a system, a method, a computer readable medium, or a computer program, or any combination of systems, methods, a computer readable medium, or a computer programs.

Certain implementations may have one or more of the following advantages. Automation of the applied number of iterations is possible using a statistically appropriate stop-criterion. The applied stop-criterion considers low count rates, for which other goodness-of-fit parameter are unreliable.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
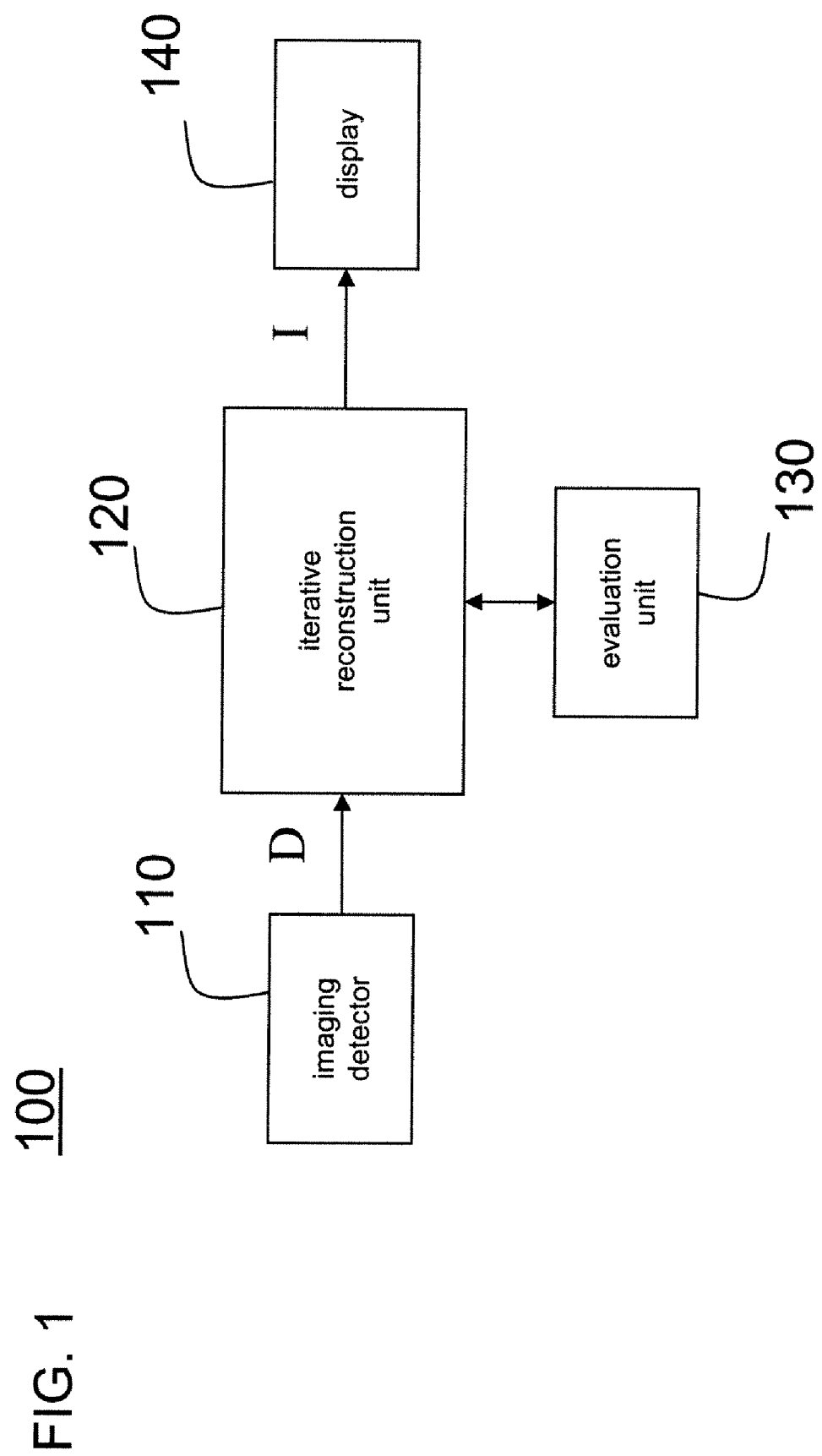
FIG. 1 is an overview of a nuclear imaging system.

FIG. 1 shows a nuclear imaging system 100 with an imaging detector 110, a reconstruction unit 120, and an evaluation unit 130. Medical imaging techniques in nuclear medicine produce two- or three-dimensional images or maps of, for example, functional processes in a patient's body by using nuclear properties of matter. Examples of such imaging techniques are Positron Emission Tomography (PET) and Single Photon Computed Tomography (SPECT). For these types of nuclear imaging, one administers a radioactive substance to the patient and detects emitted radiation with a detector system, e.g., with a ring detector for PET or with one or several gamma cameras for SPECT. Then, using especially adapted tomographic reconstruction algorithms, one reconstructs the acquired data into, e.g., a 3D image. Because too much radiation can be harmful to the patient, the flux of detected nuclear radiation, i.e. the number of counts per unit time, is limited. As a result, in nuclear imaging one often has to reconstruct the image using only a limited number of counts.

The imaging detector 110 detects γ-radiation emitted from a patient after administering a radioactive substance. The imaging detector 110 is positioned around or partly around the patient and could be, for example, a conventional SPECT or PET detector system. The detector 110 provides a data set D to the iterative reconstruction unit 120, which uses a system matrix to describe the nuclear imaging system 100 and an iteratively improved data model to calculate an image object I on the basis of the data set D. The image object I can, for example, be displayed on a display 140 using well-known volume rendering techniques. For each iteration step, the evaluation unit 130 calculates a stop-criterion, i.e. a goodness-of-fit parameter, using a chi-square-gamma ($\chi_\gamma^2$) statistic.

The chi-square-gamma statistic is used for determining the quality of an estimated data model within a reconstruction algorithm. It is further used to determine a stop-criterion for the iterations of a reconstruction algorithm. This statistic is discovered to be especially well suited for nuclear imaging because the iterations of the algorithm are limited based on a statistic that is well behaved for the low count data associated with nuclear imaging. An example of a chi-square-gamma statistic is described in K. J. Mighell, "Parameter estimation in astronomy with Poisson-distributed data. I. The $\chi$hd $\gamma^2$ statistic," Astrophys. J., 1999, 518: 380-393 and K. J. Mighell, "Parameter estimation in astronomy with Poisson-distributed data. II. The modified chi-square gamma statistic", 2000, arXiv:astro-ph/0007328, the contents of which are herein incorporated by reference. However, in this application modifications of Mighell's chi-square-gamma statistic are also considered to represent a chi-square-gamma statistic.

Quality Controlled OSEM Algorithm

Figure 2:
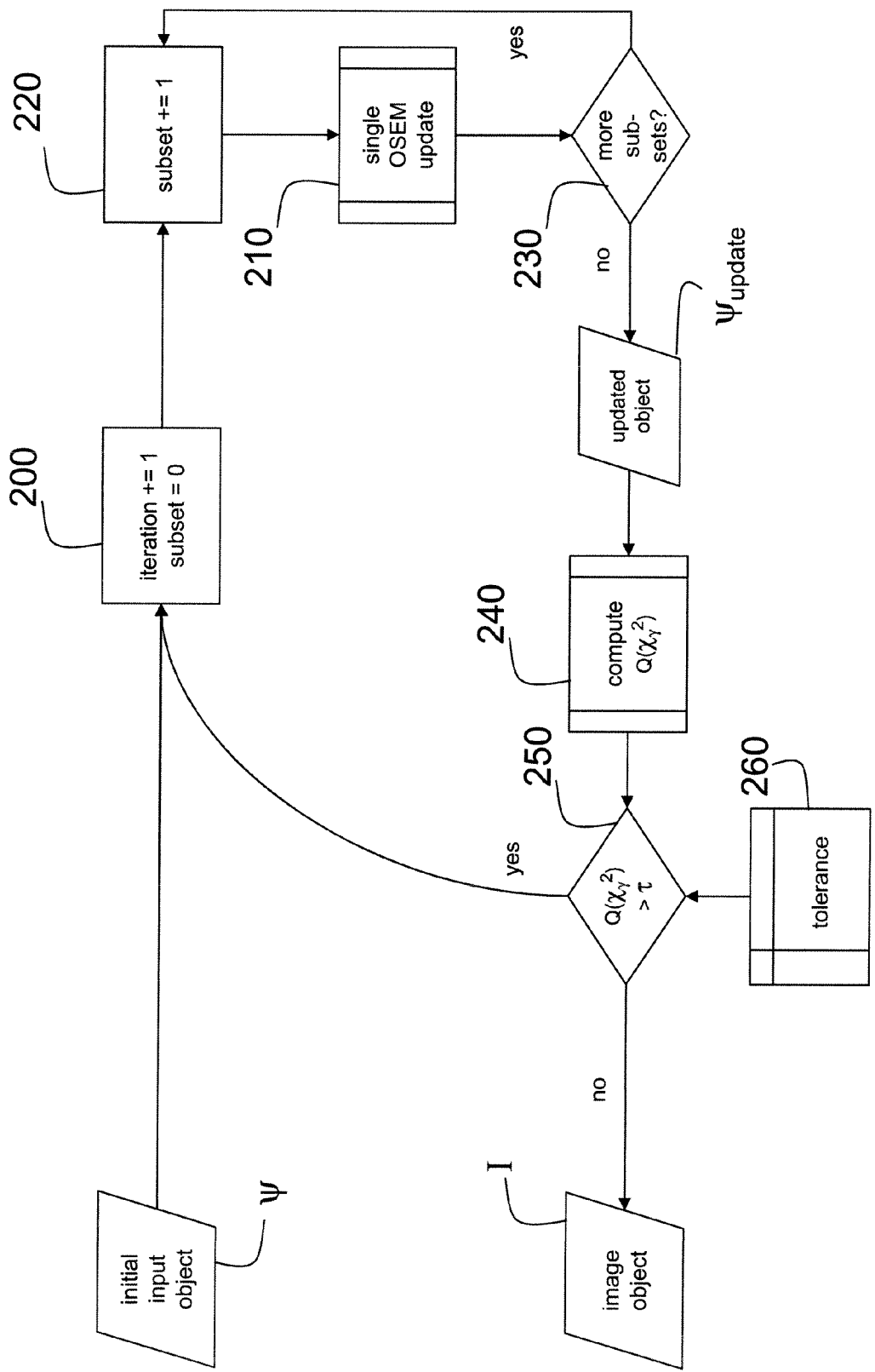
FIG. 2 is a flowchart of a stop-criterion controlled OSEM algorithm.

FIG. 2 illustrates an OSEM algorithm, in which the number of iterations is quality controlled, i.e., the quality of the approximation throughout the algorithm is evaluated to determine an appropriate end of the iterative algorithm. Depending on the algorithm, specific restrictions may apply to an initial input object ψ. For example, for the OSEM algorithm non-negativity is required.

Usually, the iteration will start in object space, which is the space in which the result of the algorithm is defined and which corresponds to the 3D volume that was imaged using the nuclear imaging system 100. During the iteration process (indicated by the increase of an iteration counter (step 200)), an updated object $\psi_{update}$ is used as an input object for the next iteration step. Thus, each iteration step begins with a new improved estimate of the object. As iteration progresses, the updated object $\psi_{update}$ converges to, for example, a distribution of a radioactive substance administered to the patient.

Within each iteration step, a single OSEM update (step 210) is calculated for a series of subsets of the data set D as indicated by incrementing a subset (step 220). In data space, the single OSEM update (step 210) compares a data model corresponding to the updated object $\psi_{update}$ with the data set D. It is followed by a test to determine whether all subsets were considered (step 230). After completing an iteration step, a stop-criterion, $Q(\chi_\gamma^2)$, is calculated (step 240). This stop-criterion, $Q(\chi_\gamma^2)$, characterizes the quality of a previously estimated object. The determined stop-criterion, $Q(\chi_\gamma^2)$, is then compared (step 250) with a threshold, τ, read from a tolerance memory 260 to determine whether another iteration step is necessary. The threshold, $\tau$, represents, for example, the tolerance within the chi-square-gamma statistic that a user is willing to accept as a deviation from the measured data set D. If no further iterations are necessary, the iteration is stopped and the currently calculated image object is assigned as the output of the reconstruction, i.e. as image object I.

Quality Controlled NNLS Algorithm

Figure 3:
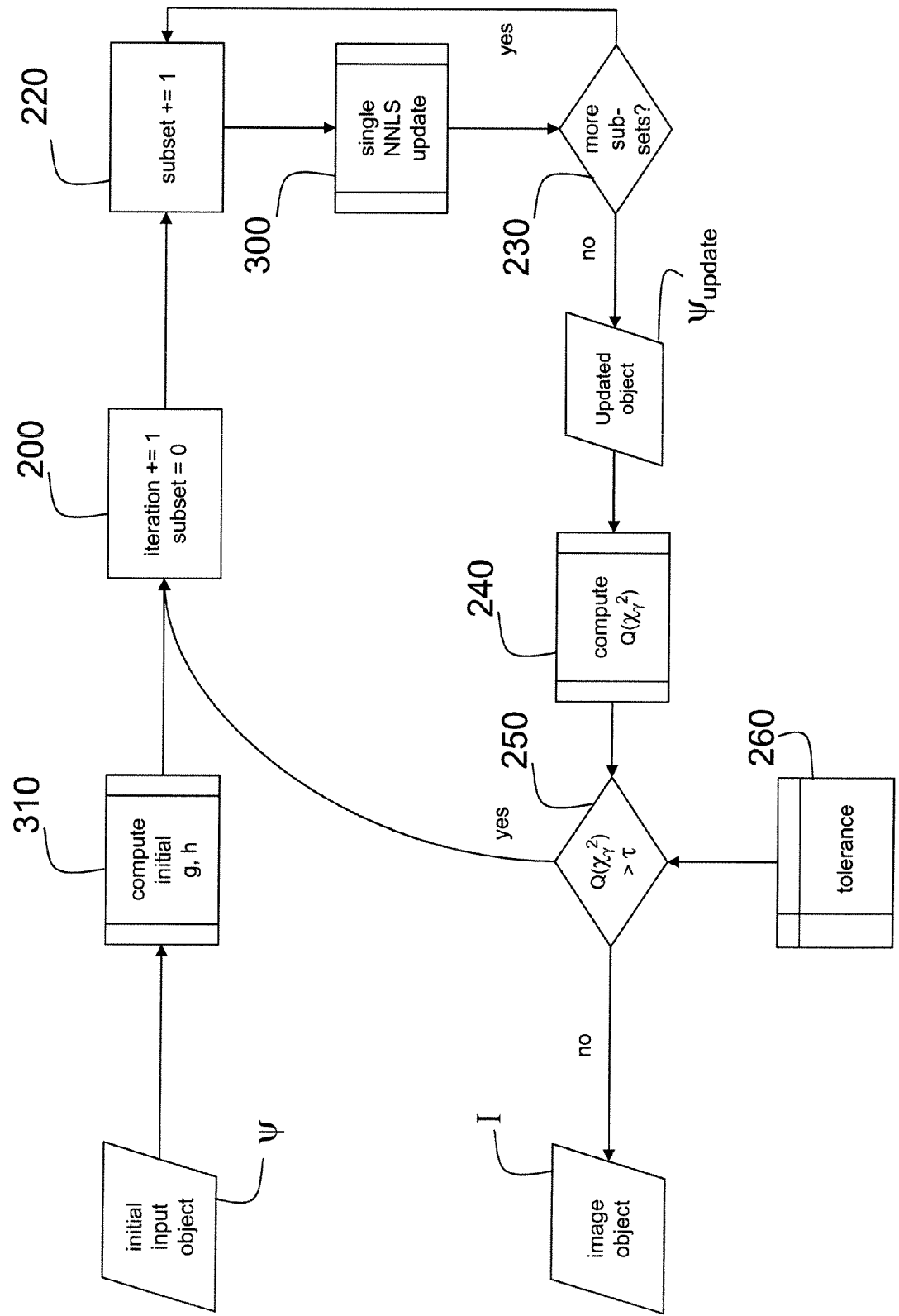
FIG. 3 is a flowchart of a stop-criterion controlled NNLS algorithm.

FIG. 3 illustrates image reconstruction using a NNLS algorithm. Like the OSEM algorithm in FIG. 2, the iterative loop over a NNLS update (step 300) enables progressive refinement of an approximation of the image object I. In contrast to the OSEM algorithm, parameters of the NNLS algorithm are initially determined (step 310). Examples for the parameters include a gradient g and a conjugate gradient h. During the iteration, these parameters are updated. At the end of each iteration, the determined stop-criterion, $Q(\chi_\gamma^2)$, is compared (step 250) with a threshold, $\tau$, read from the tolerance memory 260 to determine whether another iteration step is necessary or whether the iteration should be stopped and the currently updated image object is defined as the image object I.

Stop-Criterion Determination

Figure 4:
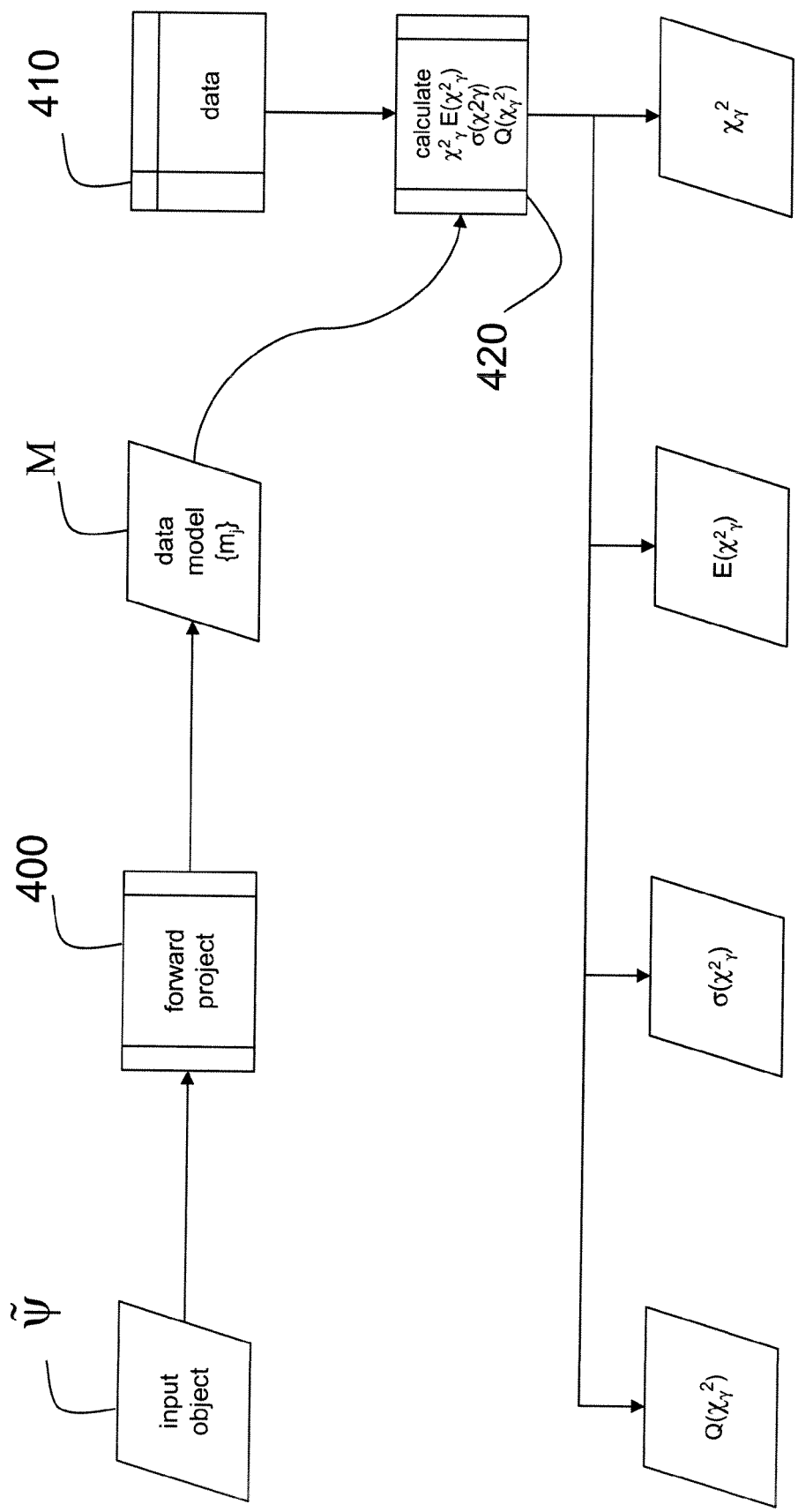
FIG. 4 is an exemplary flowchart for determining a stop-criterion.
Figure 5:
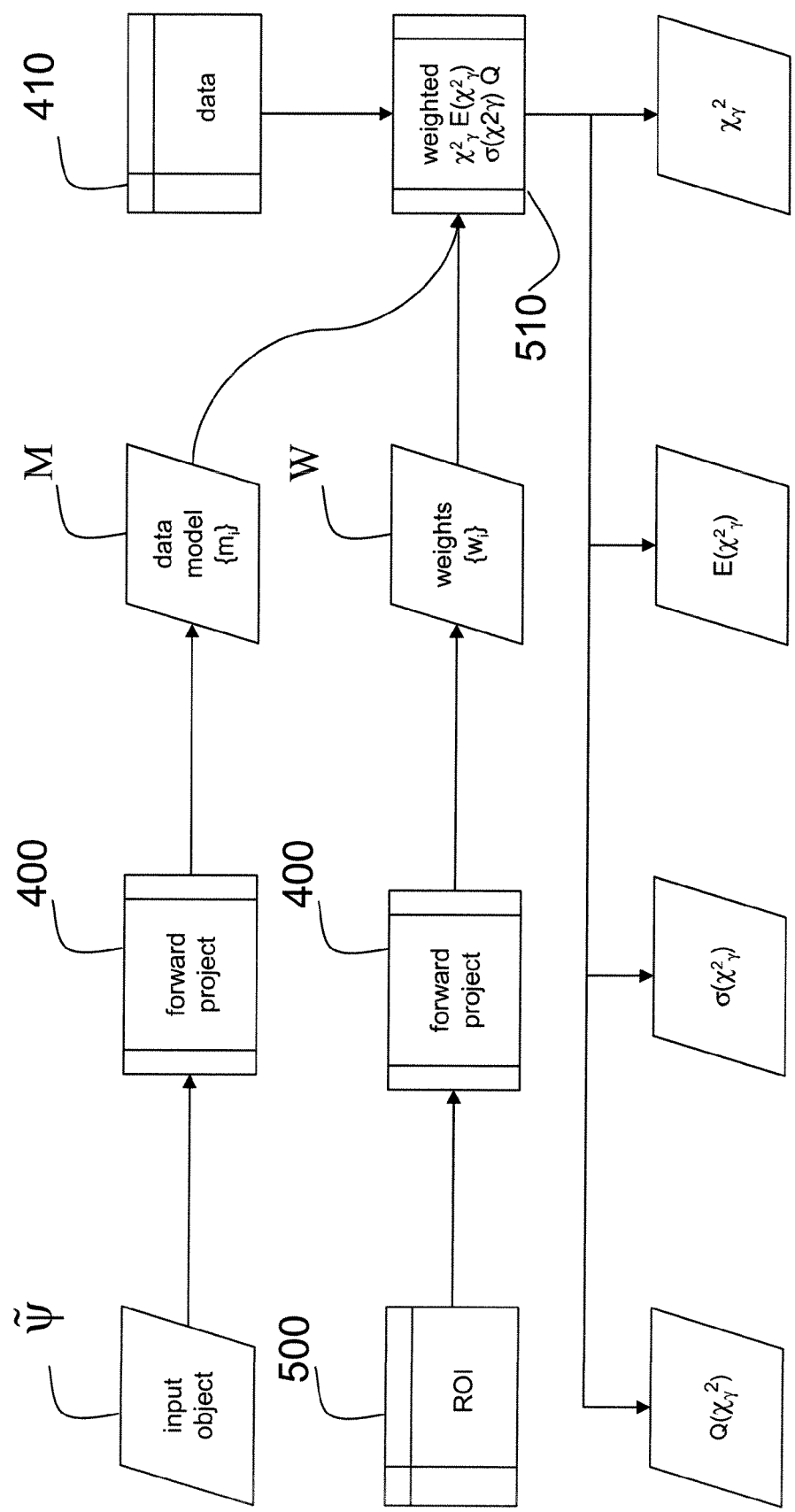
FIG. 5 is an exemplary flowchart for determining the stop-criterion for a region of interest.

FIGS. 4 to 8 illustrate example determinations of the stop-criterion, $Q(\chi_\gamma^2)$, of each estimated object during the iteration, i.e., examples of step 240, which illustrate a $\chi_\gamma^2$-controlled image reconstruction. In FIG. 4, the stop-criterion, $Q(\chi_\gamma^2)$, is calculated for the complete data model. In FIG. 5, the stop-criterion, $Q(\chi_\gamma^2)$, is calculated for a specific region of interest within the object. The calculations illustrated in FIGS. 4 and 5 can be executed independently of the estimation operations of the reconstruction algorithm or they can be integrated into the reconstruction algorithm. Examples for calculating the stop-criterion, $Q(\chi_\gamma^2)$, within an iterative reconstruction algorithm are given in FIGS. 6 to 8.

In FIG. 4, a forward projection projects an input object $\tilde\psi$ from object space into data space (step 400). Object space and data space are related to each other through the nuclear imaging system 100 by a system matrix H. A "forward projection" is an application of the system matrix H to an object in object space. The result of a forward projection is a projected object in data space. For example, projecting an estimated image into data space results in a data model M of that estimated image:

$$M_i = \sum_a H_{i\alpha} I_\alpha$$

However, the system matrix H is rarely applied as a matrix multiplication. Instead, it is represented as a product of operators $H_n$:

$$H = H_n \otimes \ldots \otimes H_2 \otimes H_1$$

Corresponding to the forward projection, the backward projection from the data space into object space can be described as an application of the transpose $H^T$ of the system matrix H:

$$I_\alpha = \sum_i H_{\alpha i} M_i$$

The transpose $H^T$ is also rarely applied as a matrix multiplication. Instead, it is represented as a product of operators:

$$H^T = H_1^T \otimes H_2^T \otimes \ldots \otimes H_n^T$$

The object $\tilde\psi$ can be either the initial object $\psi$ or any updated object $\psi_{update}$. The result of this forward projection (step 400) is the corresponding data model M of the forward projected object. The data model M has J entries $m_j$. Thus, it has the same number of entries as the data set D, the $d_j$ entries of which are measured with the detectors 110 of the imaging system 100.

For the calculation (step 420) of statistical values of the $\chi_\gamma^2$-statistic, the entries $d_j$ of the data set D are retrieved from a memory 410. Examples of statistical values include the standard deviation $\sigma(\chi_\gamma^2)$ and the expectation value $E(\chi_\gamma^2)$ of the $\chi_\gamma^2$-statistic by Mighell, which are given by the following equations:

$$\chi_\gamma^2 = \sum_{j=1}^{J} \frac{(d_j + \mathrm{Min}\{d_j, 1\} - m_j)^2}{d_j + 1} \quad (1)$$

$$\sigma(\chi_\gamma^2) = \sqrt{\sum_{j=1}^{J} \left[ \begin{array}{l} m_j^3 e^{-m_j}[Ei(m_j) - \gamma_{EM} - \ln(m_j) + 4] - m_j^2 - m_j + \\ e^{-m_j}[-2m_j^2 + 2m_j + 1] + e^{-2m_j}[-m_j^2 + 2m_j - 1] \end{array} \right]} \quad (2)$$

$$E(\chi_\gamma^2) = \sum_{j=1}^{J} (1 + e^{-m_j}(m_j - 1)) \quad (3)$$

where $d_j$ is the value of an entry j of the data set D, $m_j$ is the value of an entry j of the data model M, and Min $\{m_j, 1\}$ is the minimum of $d_j$ and 1.

The stop-criterion, $Q(\chi_\gamma^2)$, can then be defined by $$Q(\chi_\gamma^2) = \frac{\chi_\gamma^2 - E(\chi_\gamma^2)}{\sigma(\chi_\gamma^2)}. \quad (4)$$

The stop-criterion, $Q(\chi_\gamma^2)$, is used to stop the iterative calculation shown in FIGS. 2 and 3. For example, the decision step 250 of FIG. 2 or FIG. 3 compares the stop-criterion, $Q(\chi_\gamma^2)$, with a given predefined tolerance.

In some applications, only a portion of the image is of interest. In such cases, it is desirable to halt the iteration when that portion of the image, or "region of interest," attains some level of quality. FIG. 5 considers the selection of a region of interest ROI, when calculating the stop-criterion, $Q(\chi_\gamma^2)$, at each iteration. The region of interest ROI can be selected manually, automatically, or it can be predefined for specific operation modes of the nuclear imaging systems 100. A forward projection projects the region of interest ROI forward to give weights W in data space (step 400). These weights W are included in the calculation of the statistical values of the $\chi_\gamma^2$-statistic within the region of interest ROI. The modified equations (1')-(3') for the calculation in step 510 are:

$$\chi_\gamma^2 = \sum_{j=1}^{J} w_j \frac{(d_j + \mathrm{Min}\{d_j, 1\} - m_j)^2}{d_j + 1} \quad (1')$$

-continued $$\sigma(\chi_\gamma^2) = \sqrt{\sum_{j=1}^{J} w_j \begin{bmatrix} m_j^3 e^{-m_j}[Ei(m_j) - \gamma_{EM} - \ln(m_j) + 4] - m_j^2 - m_j + \\ e^{-m_j}[-2m_j^2 + 2m_j + 1] + e^{-2m_j}[-m_j^2 + 2m_j - 1] \end{bmatrix}} \quad (2')$$

$$E(\chi_\gamma^2) = \sum_{j=1}^{J} w_j(1 + e^{-m_j}(m_j - 1)) \quad (3')$$

In the equations, each entry of the data model M is assigned a weight $w_j$. The stop-criterion, $Q(\chi_\gamma^2)$, is again defined according to equation (4). However, the resulting quality would now be weighted toward the region of interest ROI.

Figure 6:
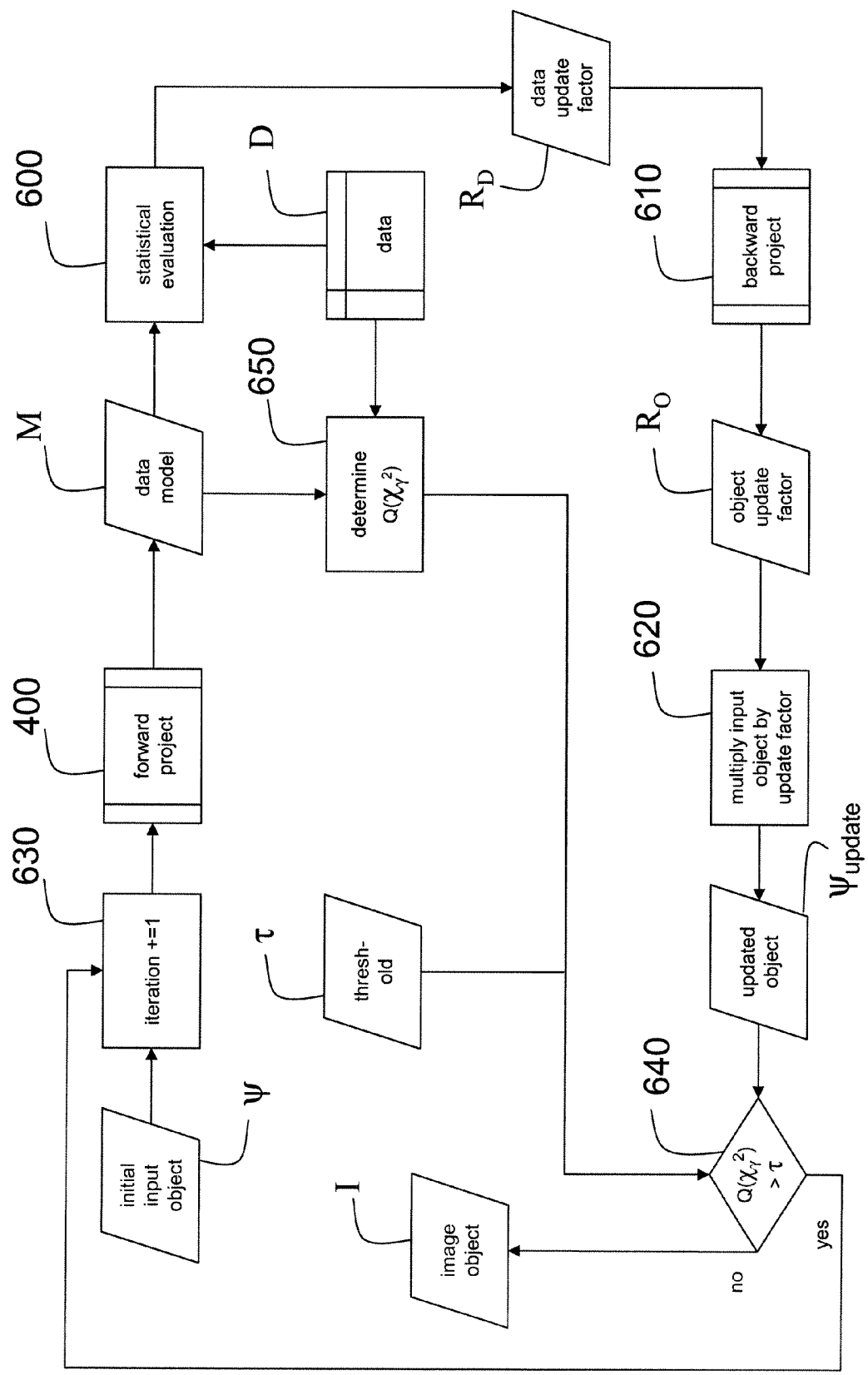
FIG. 6 is a flowchart illustrating a first example for determining the stop-criterion within a reconstruction algorithm.

An exemplary integration of FIG. 5 in a general iterative reconstruction algorithm is shown in FIG. 6. The algorithm can be, for example, one of those described in FIG. 2 and FIG. 3. As mentioned above, the iteration starts in object space with an initial input object ψ. Depending on the algorithm, a specific restriction may apply to the initial input object ψ (e.g. non-negativity for OSEM). In a first iteration step, a forward projection (step 400) of the initial input object ψ results in the data model M in data space. The data model M is statistically evaluated (step 600). The statistical evaluation is specific to the algorithm and relates the data model M and the measured data set D. The result, a data update factor $R_D$ for each entry in the data model, is projected back into object space using a backward projection (step 610). This results in an object update factor $R_O$, which is applied to the initial input object v (step 620) to provide a first updated object $\psi_{update}$.

The iteration process is indicated by incrementing the counter "iteration" (step 630). The updated object $\psi_{update}$ is now used as an input object for the next iteration step. Thus, each iteration step begins with a new estimate of the object. After several iteration steps, the estimates converge during reconstruction to, for example, the distribution of the radioactive substance administered to the patient.

During or after each iteration step, a quality evaluation (step 640) determines whether the data model M fulfills a preset condition. One such condition is a comparison of the stop-criterion, $Q(\chi_\gamma^2)$, with a threshold τ (step 640). The threshold τ can be algorithm-specific or it can be assigned by a user.

The stop-criterion, $Q(\chi_\gamma^2)$, is calculated (step 650) using the data model M and the projection data D. The result is then used for the quality evaluation (step 640). When defining the stop-criterion, $Q(\chi_\gamma^2)$, according to equation (4), the threshold τ can be set as 1. Thus, a $Q(\chi_\gamma^2)$-value greater than one will supply the updated object $\psi_{update}$ to the next iteration step. A $Q(\chi_\gamma^2)$-value smaller than 1 will stop the iteration and assign the updated object update to be the image object I of the reconstruction.

The threshold τ can also be defined using statistical values. For example, using the expectation value $E(\chi_\gamma^2)$ and the standard deviation $\sigma(\chi_\gamma^2)$, the threshold τ may be defined as $$\tau = E(\chi_\gamma^2) + n \cdot \sigma(\chi_\gamma^2).$$

A user may adjust the positive factor n to be, for example, between 0 and 10, between 0.5 and 5, or equal to 1, 2 or 3. The reconstruction continues for $\chi_\gamma^2 \geq \tau$, but stops as soon as $\chi_\gamma^2 \leq \tau$.

Figure 7:
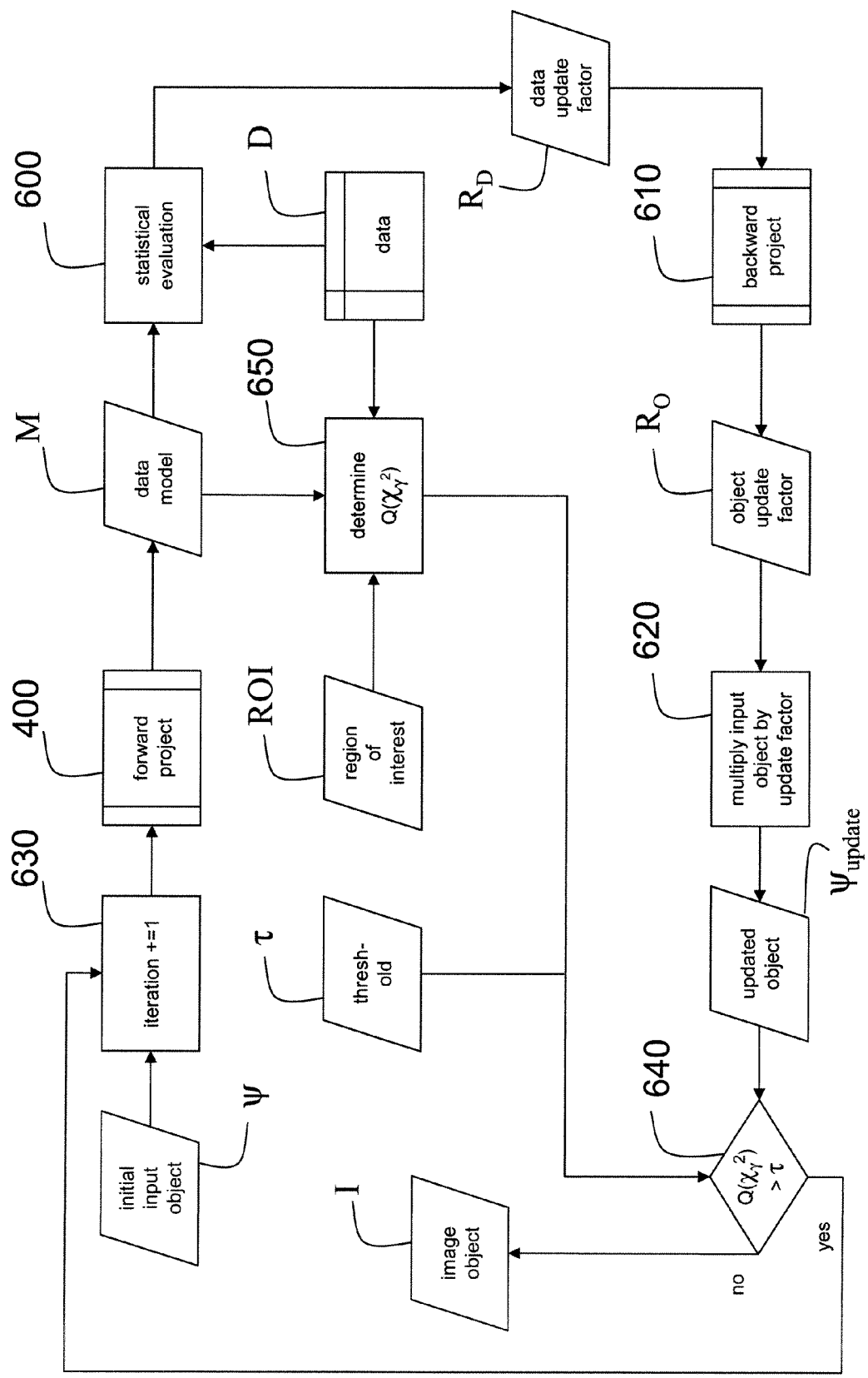
FIG. 7 is a flowchart illustrating a second example for determining the stop-criterion within a reconstruction algorithm.

In another embodiment, shown in FIG. 7, a region of interest ROI within the data model M is defined to weigh the determination of quality. In such embodiments, the region of interest ROI is defined in object space and projected into data space, as discussed before in connection with FIG. 5.

In FIGS. 6 and 7, the stopping criterion is determined based on using the data model of the input object ψ for the evaluation at the end of each iteration. In that case, either the updated object (or the input object A) of the preceding iteration or the current updated object $\psi_{update}$ can be the output of the algorithm.

Figure 8:
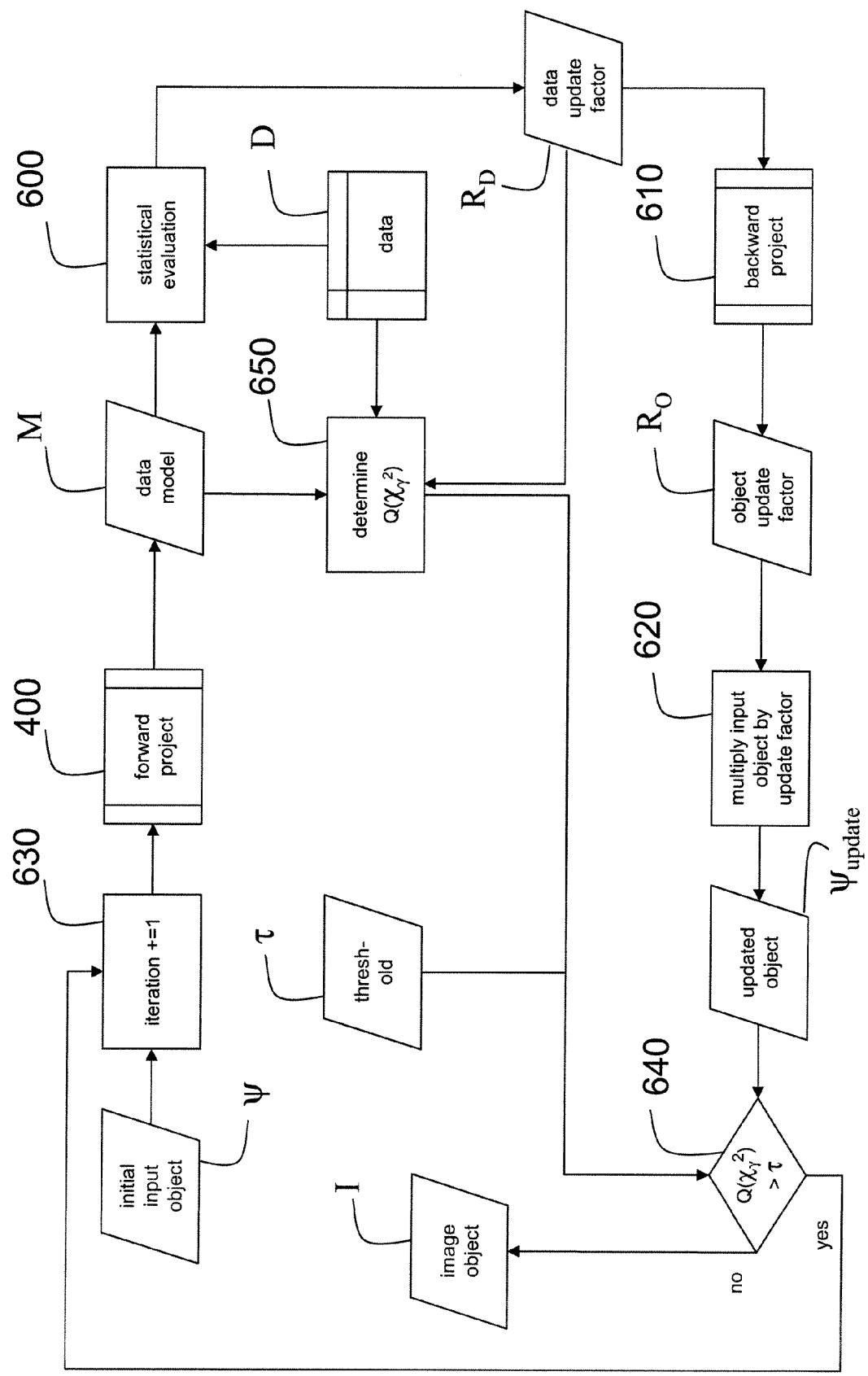
FIG. 8 is a flowchart illustrating a third example for determining the stop-criterion within a reconstruction algorithm.

FIG. 8 shows an embodiment that uses the updated object $\psi_{update}$ or an approximation thereof for the calculation of the stop-criterion, $Q(\chi_\gamma^2)$ (step 650). In this case, the updated object $\psi_{update}$ or the approximation thereof is calculated using the data update factors $R_D$. This is indicated in FIG. 8 by providing the data update factors $R_D$ to the calculation of the stop-criterion, $Q(\chi_\gamma^2)$ (step 650).

Pixon Method of Image Reconstruction 3D image reconstruction can be based on a 3D pixon method that uses a pixon map, which interacts with a pixon reconstruction algorithm. The 3D pixon method provides high quality reconstruction of a 3D image object I in object space from a measured data set D in data space. As a spatially adaptive reconstruction method, the pixon method applies a data-motivated smoothing operation for every point in object space (hereafter an "object point"). In doing so, the pixon method uses the principal of minimum complexity when assigning to every object point a pixon kernel function, which is the basis for the smoothing operation. For pixon reconstruction, the pixon map defines which of the pixon kernel functions is assigned to the object points.

Pixon Smoothing Operation

Pixon smoothing can be viewed as averaging values of an object over a specific volume defined by the pixon kernel function to produce a value of an image object point. The smoothing operation can be written as a matrix operation using a pixon kernel operator K, such that the (smoothed) image object I is given by applying the pixon kernel operator K to a pseudo-image object ψ':

$$I_\alpha = \sum_\beta K_{\alpha\beta} \psi'_\beta$$

"Pseudo" indicates that the pixon smoothing operation can be understood as a transformation (using the pixon kernel operator K) from a (pseudo-)object space, i.e. the pre-pixon smoothing space, to the object space of the 3D image object I. Applying the transpose operator of the pixon kernel operator, $K^T$, then projects from the object space back into the pseudo-object space.

In many cases, the smoothing operation is a convolution operation given by:

$$I_\alpha = \sum_\beta K_{\alpha-\beta} \psi'_\beta$$

Convolutions can be calculated, for example, by a direct summation for small pixon kernel functions and by fast Fourier transforms (FFTs) for large kernel functions. If the kernel function can be factorized, a product of operators can be applied to simplify the calculation. Pixon kernel functions, which can be discrete or continuous, are defined over a volume that surrounds an object point. The volume can be limited (over one or more object points) or it can extend over the complete object space. Examples for 2D or 3D pixon kernel functions include a Gaussian function, an inverted paraboloid, or a function $f(x; \beta) = (1 + \beta x^2)^{-1/\beta^2}$, which approximates the Gaussian and parabolic functions for β-values of zero or infinity. The shape of the pixon kernel function can be symmetric, or it can be adjusted in response to a form prevailing in the image object I. Within the shape of the pixon kernel function, one can weight the contribution of an object point. A limiting case of a pixon kernel function is the delta-function, in which the pixon smoothed object and the unsmoothed object are identical.

The pixon map P provides, for every object point, a pixon kernel function that is determined on the basis of a minimum complexity method. This pixon kernel function is used in the pixon smoothing operation applied in object space. Several examples of reconstruction algorithms using the pixon method are described with reference to FIGS. 9 to 15.

Reconstruction Algorithm

Iterative image reconstruction methods, such as non-negative least square or Poisson-likelihood algorithms, iteratively fit image models to measured data and thus minimize the effect of noise on the final image. The result of a reconstruction algorithm is an approximated image that is fit to the measured data set D according to the rules of the algorithm. Using the pixon method, such an approximated image can be used as an input object for pixon smoothing (see FIG. 9) and for pixon reconstruction (see FIGS. 13 and 15).

Sequential Pixon Smoothing

Figure 9:
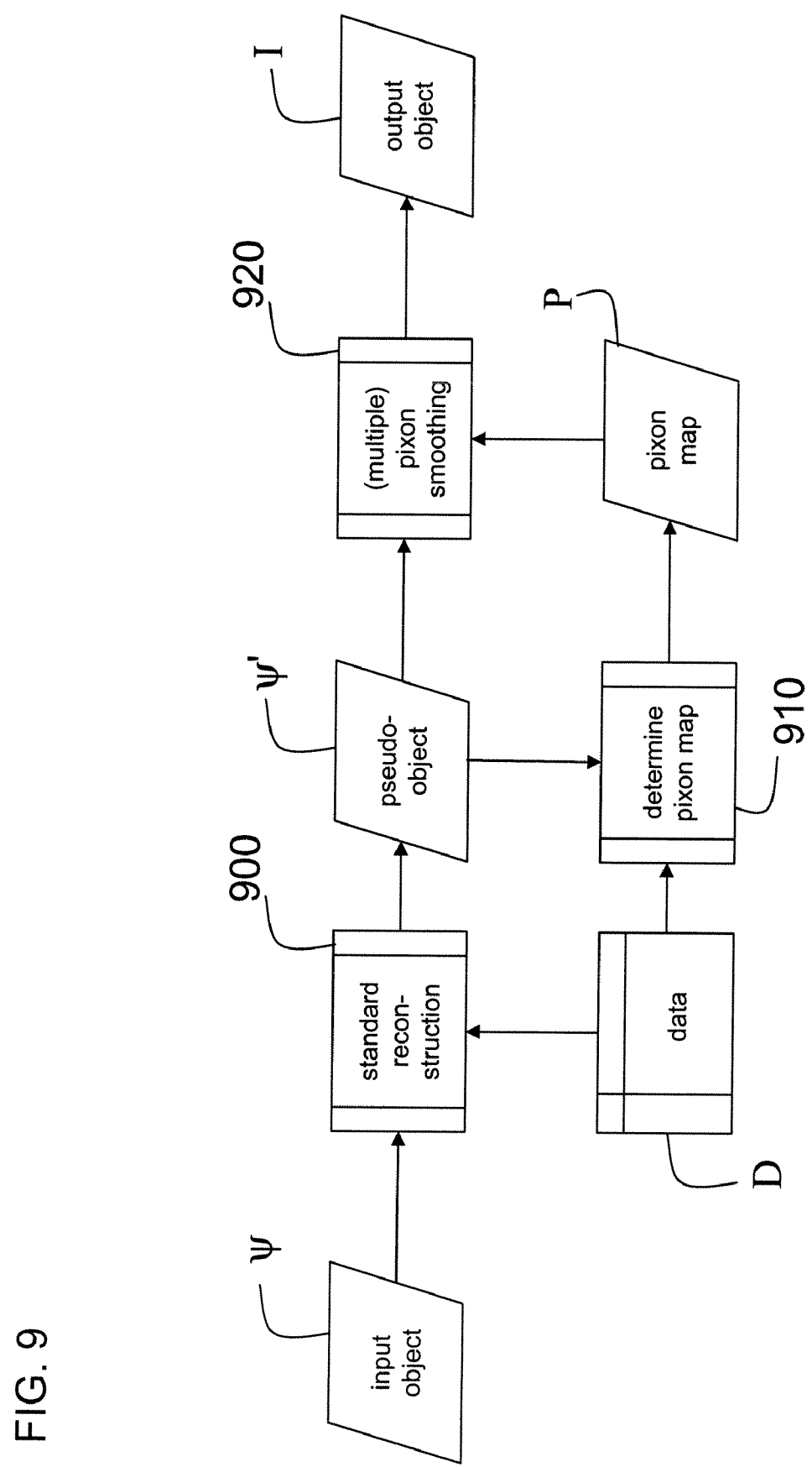
FIG. 9 is a flowchart illustrating an example of image reconstruction using multiple pixon smoothing.

In FIG. 9, (multiple) pixon smoothing is applied sequentially to a standard reconstruction algorithm. Examples of reconstruction algorithms include iterative image reconstruction methods, such as non-negative least square or Poisson likelihood algorithms, which iteratively fit image models to the data. As discussed in the background section, an overview of different reconstruction methods is given in R. C. Puetter et al., "Digital Image Reconstruction: Deblurring and Denoising," Annu. Rev. Astro. Astrophys., 2005, 43: 139-194, the contents of which are herein incorporated by reference. Exemplary algorithms for reconstruction include a non-negative least squares fit (NNLS) or the above mentioned OSEM algorithm. Within the OSEM algorithm, an iteration step is defined as a single pass through a set of data subsets. For each data subset, one uses the current estimate to initialize the application of the expectation maximization.

Using a standard reconstruction algorithm, the 3D input object ψ is fitted to the measured data set D (step 900). In accordance with the above discussed use of the pixon kernel operator K, the resulting estimate of the 3D object is called a pseudo-object ψ'. One then calculates the pixon map P using the pseudo-object ψ' and the measured data set D (step 910). The pseudo-object ψ' is also the initial object for the multiple pixon smoothing operation (step 920), which will be described in more detail in connection with FIGS. 10 to 12. During the multiple pixon smoothing operation (step 920), one repetitively smoothes each object point of the pseudo-object ψ' over a pixon kernel function assigned by the pixon map P until a required quality of the 3D image object I is reached.

Figure 10:
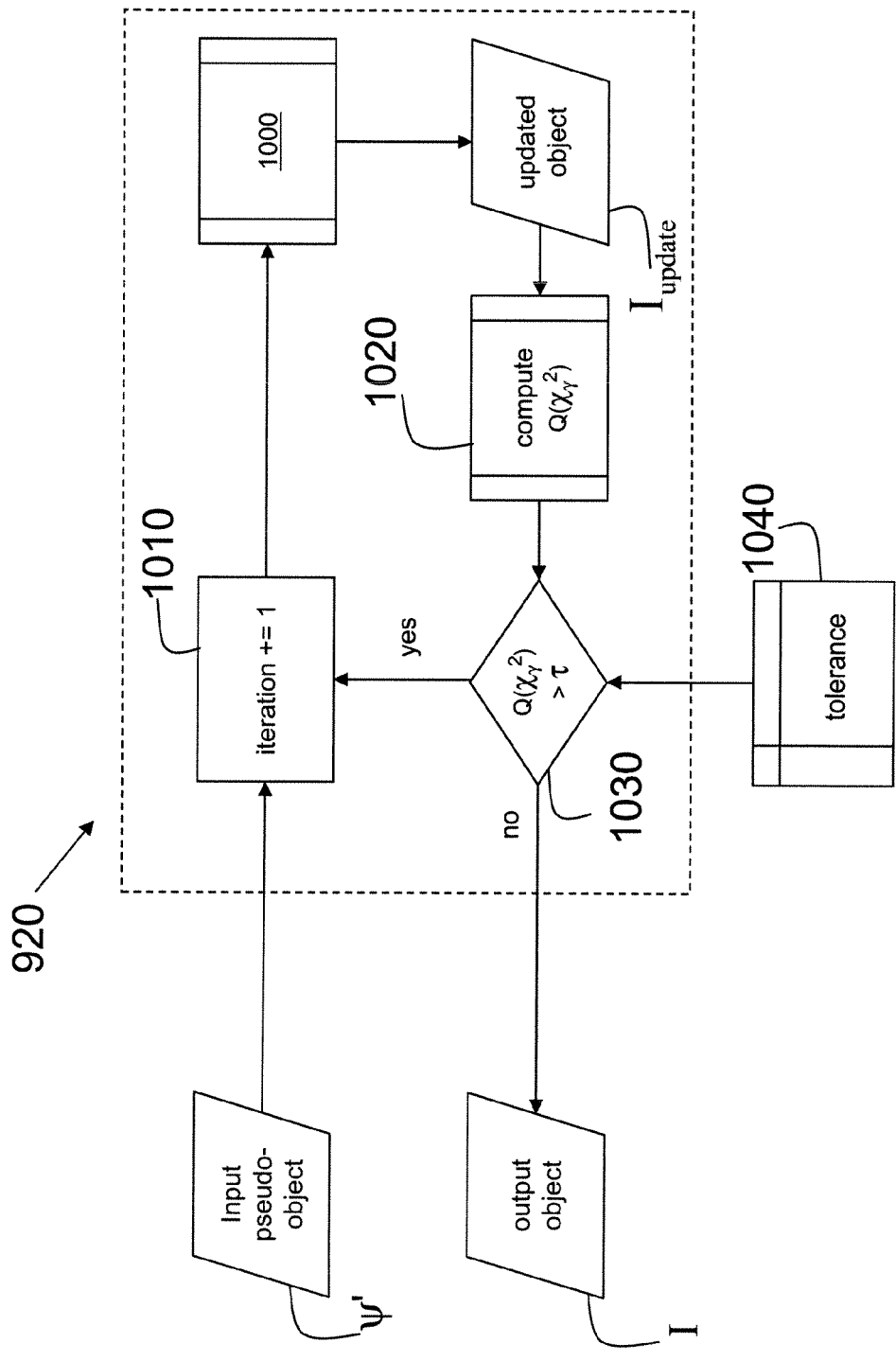
FIG. 10 is a flowchart illustrating a pixon smoothing operation.

FIG. 10 shows the details associated with the multiple pixon smoothing (step 920). The pseudo-object ψ' is smoothed using a pixon forward smoothing operation (step 1000), which results in an updated object $I_{update}$. An iterative cycle is indicated by increasing an increment, iteration (step 1010). After completing an iteration step, a stop-criterion, $Q(\chi_\gamma^2)$, is calculated (step 1020) and a quality evaluation (step 1030) determines whether a data model corresponding to the updated object $I_{update}$ fulfills a preset condition. One such condition is a comparison of the stop-criterion, $Q(\chi_\gamma^2)$, with a threshold, τ. The threshold, τ, can be algorithm-specific or it can be assigned by a user and stored in the tolerance table 1040. Thus, in such a goodness-of-fit evaluation of the updated object $I_{update}$, the quality of the pixon smoothed image can be used to end the iteration.

Figure 11:
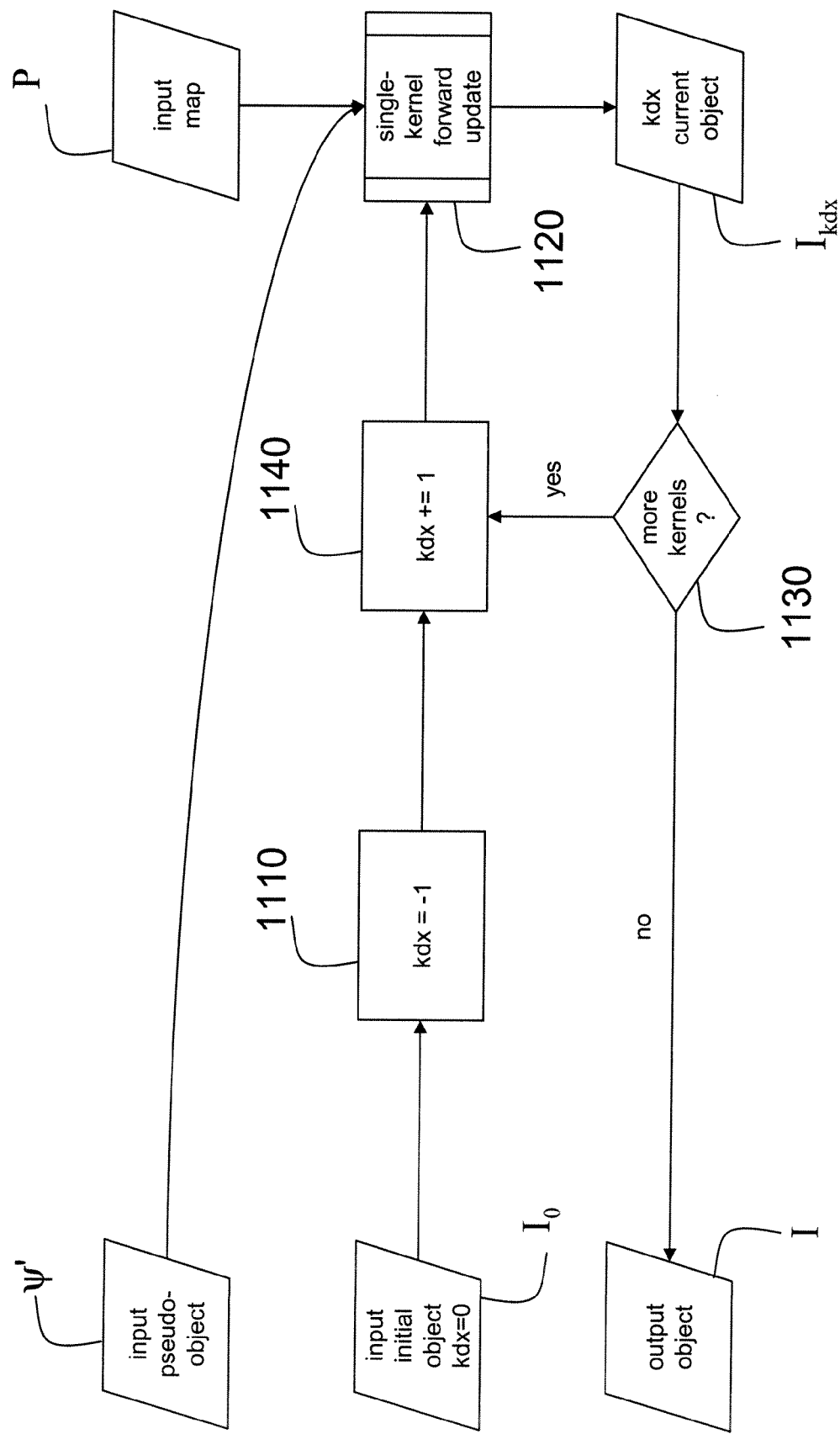
FIG. 11 is a flowchart illustrating a single kernel function update during the pixon smoothing operation.

FIG. 11 shows the details associated with the pixon forward smoothing operation (step 1000) of the pseudo-object ψ'. Using the pixon map P, one builds a smoothed image by smoothing each object point with the pixon kernel function that is assigned to the object point in the pixon map P. The smoothed image is composed by smoothing the pseudo-object ψ' by iteratively considering each of the provided pixon kernel functions. Thus, each object point is smoothed with its corresponding pixon kernel function as indicated in the pixon map P. For the first step, an initial image object $I_0$ with the dimension of the image object and only data points with value zero and a kernel pointer kdx (indicating the kernel function) are prepared (step 1110) and provided to a single-kernel function forward update (step 1120). The pseudo-object ψ' and the pixon map P are also input parameters to the single-kernel forward update (step 1120). Output parameters of the single-kernel forward update (step 1120) are the unchanged kernel pointer kdx and an updated image object $I_{kdx}$. At the end of each iteration, one determines whether another pixon kernel function update is necessary (step 1130), in which case the kernel pointer kdx needs to be increased (step 1140), or whether all kernel functions have been considered, in which case one assigns the updated image object $I_{kdx}$ to be the final 3D image object I.

Figure 12:
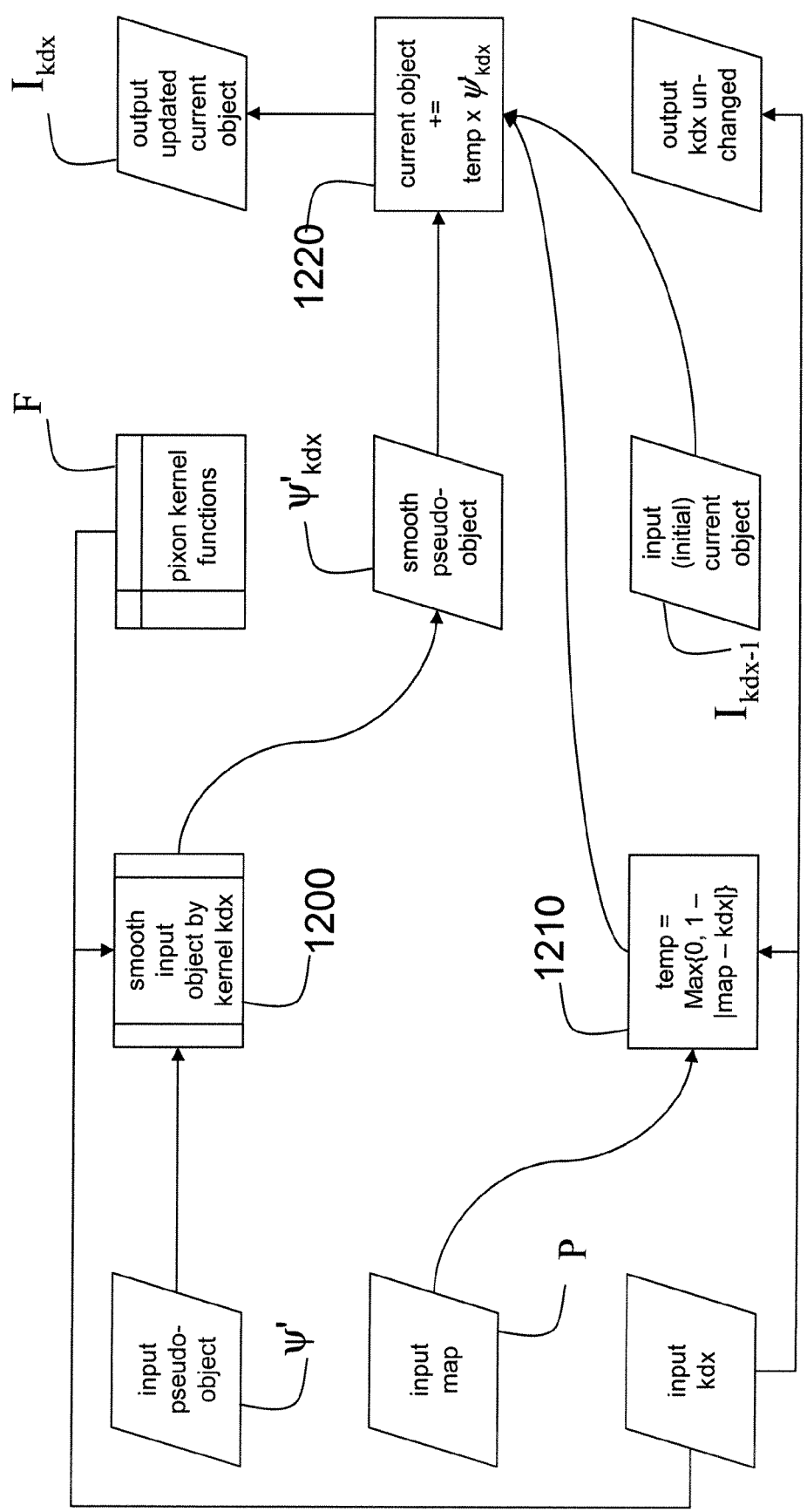
FIG. 12 is a flowchart illustrating a first example of image reconstruction using pixon reconstruction.

FIG. 12 shows, in detail, the steps in the single-kernel function update (step 1120) of an image object $I_{kdx-1}$ as discussed in connection with FIG. 11. The image object $I_{kdx-1}$ comprises smoothed values for all object points, for which the pixon map P indicated smoothing with pixon kernel functions identified by kernel pointers smaller than the current kernel pointer kdx. The pseudo-object ψ' is smoothed with the kernel function indicated by the current kernel pointer kdx. The result is a smoothed pseudo-object ψ'$_{kdx}$ (step 1200). Then, one determines how much a data point is affected by the current kernel function (step 1210). The corresponding calculation uses the pixon map P and the current value of the kernel pointer kdx to determine a temporary field, temp, which is zero if the object point is not affected. The temporary field, temp, has values between 0 and 1 when two kernel functions are used for smoothing of the object point and a value of 1 when only the current pixon kernel function is used for smoothing of the object point. For updating each affected object point of the image object $I_{kdx-1}$, one adds, to the current value of the image object $I_{kdx-1}$, the product of the values of the temporary field, temp, and of the smoothed pseudo-object ψ'$_{kdx}$ of that object point (step 1220). The result is the updated image object $I_{kdx}$.

There exist a variety of ways to apply pixon smoothing. Single or multiple pixon smoothing can be followed by standard reconstruction using the pixon smoothed object as an initial object for the reconstruction. Additionally, or as an alternative to the pixon forward smoothing with the operator K, a backward pixon smoothing can be used to conceive the object with a transposed pixon operator $K^T$.

For many pixon smoothing operations, the pixon map P defines which of the pixon kernel functions are applied to an object point. The result of sequential pixon smoothing is an output object I, which is a reconstructed object that fulfills the additional constraints imposed by the pixon method.

Pixon Reconstruction Algorithm

Figure 13:
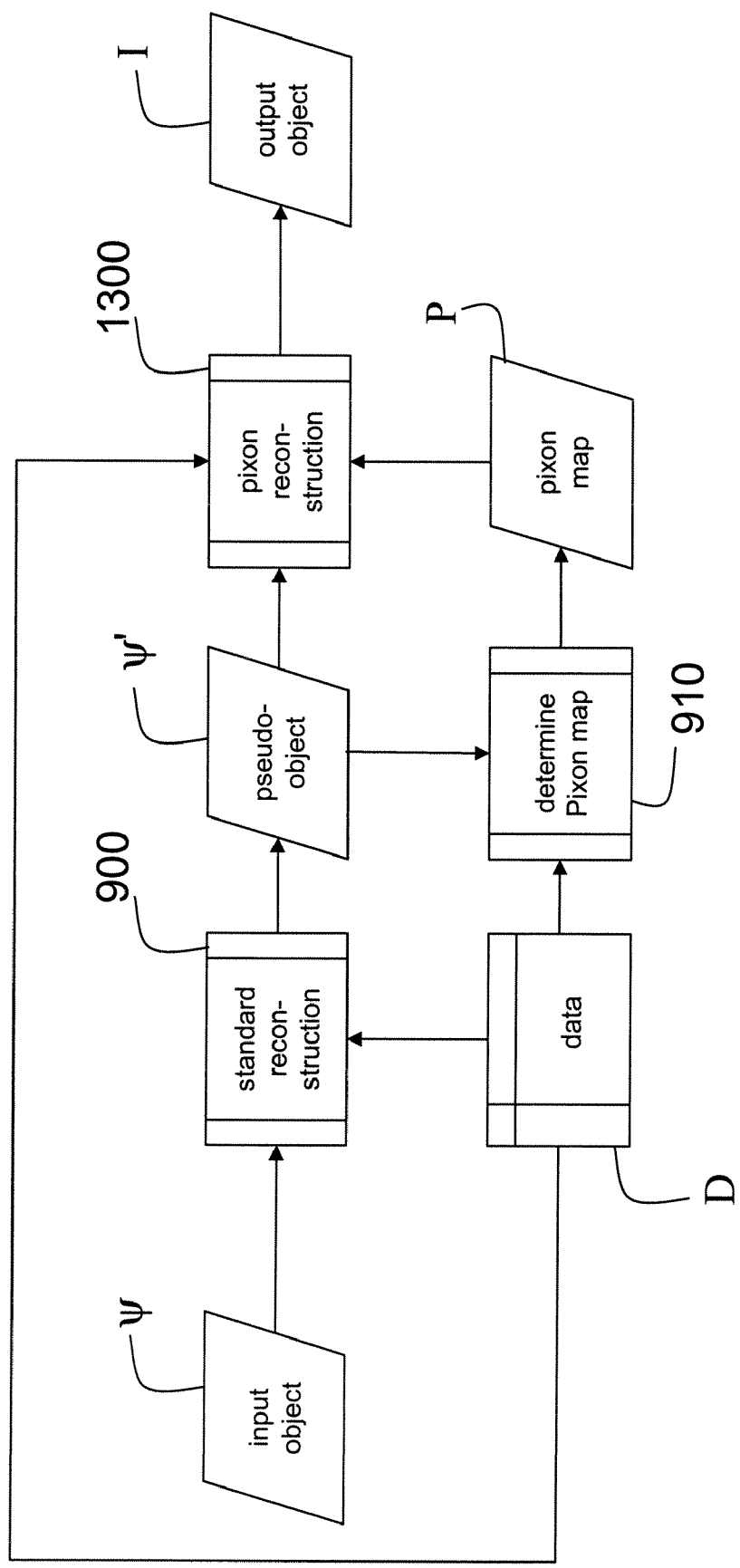
FIG. 13 is a flowchart of a stop-criterion controlled pixon reconstruction algorithm.

FIG. 13 illustrates sequential application of pixon reconstruction to a standard reconstruction algorithm. As for sequential pixon smoothing of FIG. 9, a pseudo-object ψ' and a pixon map P are determined (steps 900 and 910). However, the multiple pixon smoothing operation (step 920) is replaced with a pixon reconstruction (step 1300). The basis of pixon reconstruction (step 1300) is an iterative reconstruction algorithm that uses pixon smoothing operations within each iteration. After completing an iteration step, a stop-criterion, $Q(\chi_\gamma^2)$, is calculated and a quality evaluation determines whether a data model corresponding to the updated object $I_{update}$ fulfills a preset condition.

Examples of pixon smoothing operations include application of a pixon operator K before a forward projection operation from object space into data space or application of a transposed pixon operator $K^T$ following a back-projection from data space into object space. The pixon smoothing operations can be integrated into conventional reconstruction algorithms, such as non-negative least square fits, or in reconstruction algorithms using subsets of the data set D, such as the OSEM algorithm.

Figure 14:
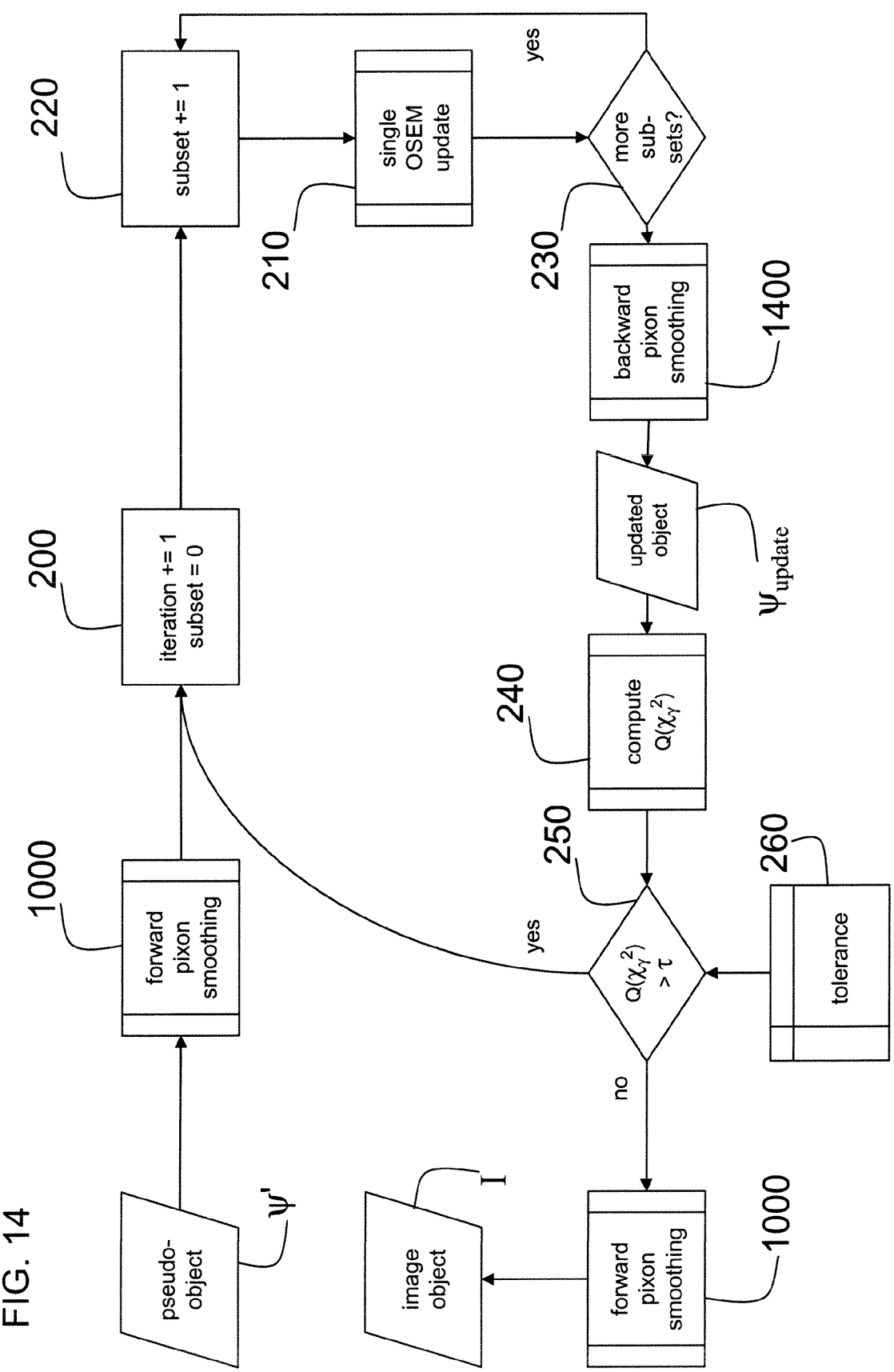
FIG. 14 is a flowchart illustrating a second example of image reconstruction using pixon reconstruction.

FIG. 14 illustrates, as an example, a pixon reconstruction algorithm based on an OSEM algorithm as discussed in connection with FIG. 2. Within the pixon reconstruction algorithm, pixon forward smoothing operations (step 1000) based on pixon operator K are applied before entering the iteration cycle and after the comparison of the stopping criterion, $Q(\chi_\gamma^2)$, with the threshold, τ (step 250). A pixon backward smoothing operation (step 1400) based on the transposed pixon operator $K^T$ is applied before calculating $Q(\chi_\gamma^2)$ (step 240). Alternatively, or in addition, pixon forward smoothing operations can be applied before entering the subset iteration cycle or, for a subset, before a single OSEM update (step 210). Another pixon backward smoothing operation can be applied after the single OSEM update (step 210).

Combined Pixon Map and Reconstruction Algorithm

Figure 15:
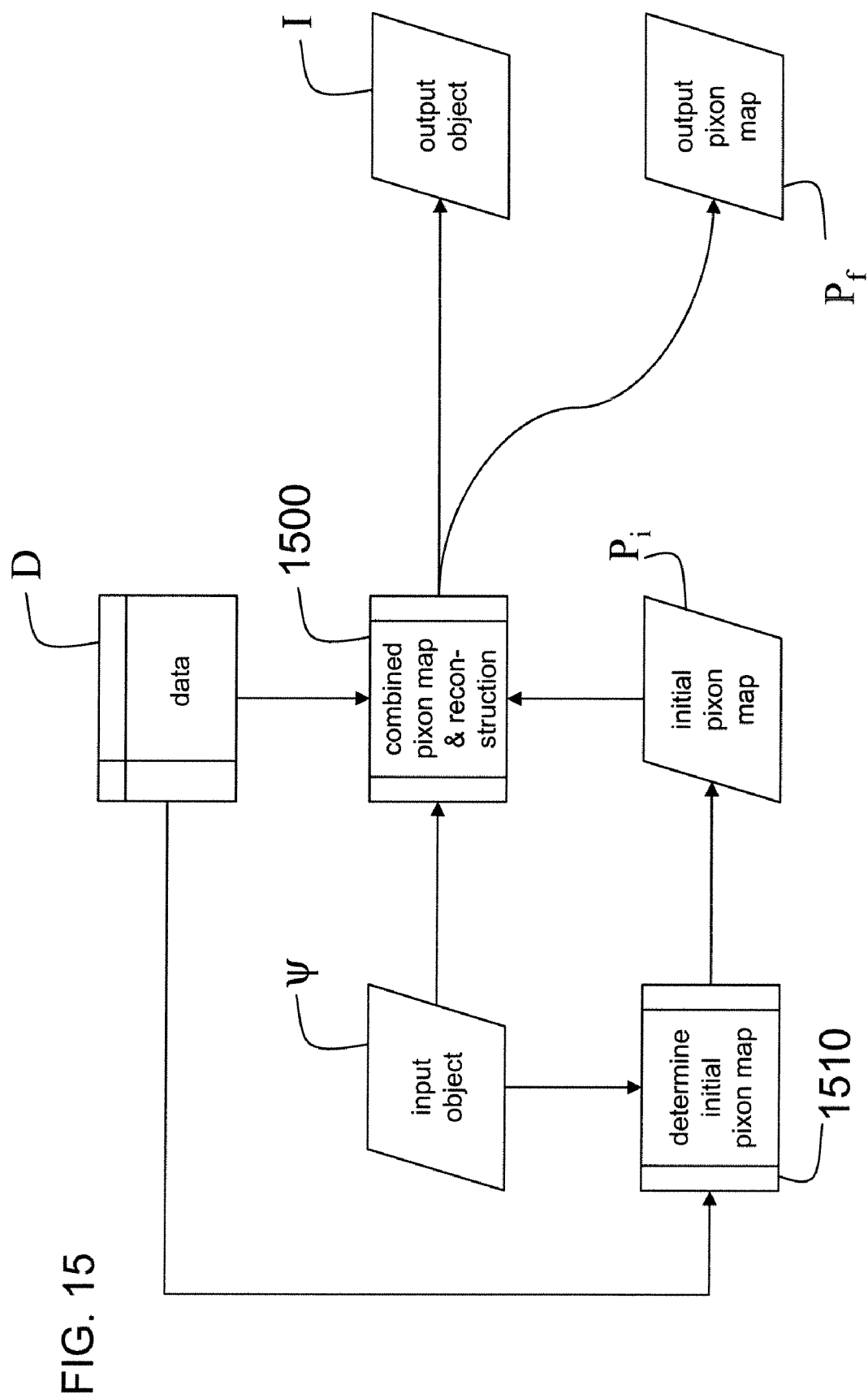
FIG. 15 is a flowchart of a stop-criterion controlled, combined pixon map and reconstruction algorithm.

In FIG. 15, the pixon reconstruction and the standard reconstruction algorithm are combined into a combined pixon map and reconstruction algorithm that estimates the final 3D image object I based on a 3D input object ψ (step 1500). The 3D input object ψ is used to determine an initial pixon map $P_1$ (step 1510), which is used for applying the first pixon smoothing operation within the combined pixon map and reconstruction algorithm. Updated pixon maps are calculated within the algorithm (step 1500). An output of the combined pixon map and reconstruction algorithm (step 1500) is a final pixon map $P_f$ which indicates the pixon kernel functions used for the last smoothing operation. This final pixon map $P_f$ is provided, together with the final image object I, as an output.

A number of embodiments have been described. Nevertheless, it will be understood that various modifications may be made without departing from the spirit of the invention defined by the appended claims. For example, as an alternative to a rendering visualization of the output object in FIG. 1, the output object can be supplied to a record keeping system (e.g., PACS system) or a system for automatic quantitative diagnosing.

The quality evaluation within an iteration step can be based on an updated object of a preceding iteration, which is the input object of the current update operation. Then, the calculation of the data model is executed in the beginning of the iteration step. One can use the data model for the quality evaluation (for example, the calculation of the stop-criterion) as well as for the update operation. However, one might not be able to abort the calculation during the iteration step. Thus one may be able to select the reconstructed image to be the last or the second to last updated object.

Alternatively, one can evaluate the quality of the most recent updated object at the end of an iteration step. In this case, one can calculate the data model based on the most recent updated object, i.e. the one just determined. When one has the possibility to store the associated data model temporarily, one can use the calculated data model if another update operation is executed. This case can have the advantage that only the calculations necessary for the calculation of the updated object and the quality evaluation are executed.

When determining the stop-criterion, one can use the Mighell chi-square-gamma statistic or a Mighell-like chi-square-gamma statistic. For example, the denominator in equations (1) or (1') can be the sum of the corresponding value of the data set D and a statistical-data-offset number with, for example, a value between 0 and 20, between 0.1 and 10, between 0.5 and 5, or equal to 0.5, 1, 2 or 3. Alternatively, one can employ a condition such as dividing the numerator only by the corresponding value of the data set or the sum of the value of the data set with the statistical-data-offset number if the condition is fulfilled that the value of the data set D is greater than some threshold, for example greater than 0. If the condition is not fulfilled one uses the value zero for that data point in the sum. Thus, the chi-square-gamma statistic in this applications is understood to include such Mighell-like statistics.

Moreover, the order in which the different pixon kernel functions are tested can be varied, the step size can be varied, or some pixon kernel functions may only be considered in defined areas of the image.

The table F of the pixon kernel function may comprise, for example, ten spherical kernel functions. If one does not want to impose symmetry, one may use additionally or alternatively elliptical pixon kernel functions. However, asymmetric kernel functions may increase the computational effort, which one can handle, for example, by using specifically designed hardware.

The pixon map P can be provided, for example, as a field of variables defining the pixon kernel functions or as a field of indices, which indicate kernel functions within the table F of the pixon kernel functions.

Various combinations of the pixon methods described referring to FIGS. 9 to 15 can be employed. The pixon smoothing operation may be the calculation of a mean average of the values of the object points within the volume defined by the corresponding pixon kernel function.

Moreover, the algorithms are not restricted to the specific use of a pixon map based on pixon kernel functions to constrain the reconstruction. Instead of a pixon smoothing operation, one can integrate smoothing operations that are based on Fourier filtering, application of a Wiener filter, wavelet filtering and/or application of a fixed filter. The associated filter functions can be stored in a map corresponding to the pixon map.

It is to be further understood that, because some of the constituent system components and method steps depicted in the accompanying figures can be implemented in software, the actual connections between the systems components (or the process steps) may differ depending upon the manner in which the disclosed method is programmed. Given the teachings provided herein, one of ordinary skill in the related art will be able to contemplate these and similar implementations or configurations of the disclosed system and method.

For example, the numerical and symbolic steps described herein can be converted into a digital program executed, e.g., on a digital signal processor according to methods well known in the art. The digital program can be stored on a computer readable medium such as a hard disk and can be executable by a computer processor. Alternatively, the appropriate steps can be converted into a digital program that is hardwired into dedicated electronic circuits within the compressor that executes the steps. Methods for generating such dedicated electronic circuits based on a given numerical or symbolic analysis procedure are also well known in the art.

Accordingly, other embodiments are within the scope of the following claims.

What is claimed is:

1. An iterative reconstruction method for reconstructing a reconstructed image object, the method comprising:
   providing an initial image object representing radiation from a patient;
   reconstructing, in a series of iteration steps by a processor, updated image objects, wherein each iteration step includes determining a data model from an input image object, the input image object of a first iteration being the initial image object and the input image objects of subsequent iterations being the updated image objects from previous iterations, and determining a stop-criterion of the data model on the basis of a chi-square-gamma statistic;
   determining that the stop-criterion of the data model has transitioned from being outside a limitation of a threshold value to being inside the limitation, the stop-criterion or the threshold being a function of a statistical value of the chi-square gamma statistic, the stop-criterion or the threshold varying by spatial location and being weighted toward a region of interest within the volume;
   ending the iterations;
   selecting one of the updated image objects to be the reconstructed image object; and
   displaying an image of the updated image object.

2. The method of claim 1, further comprising selecting the input image object from the group consisting of the updated image object from a preceding iteration step and the updated image object of the iteration step.

3. The method of claim 1, further comprising selecting the reconstructed image object from the group consisting of the updated image object of a last iteration step and the updated image object of a preceding iteration step.

4. The method of claim 1, further comprising setting the stop-criterion to be the ratio of the difference between a value of the chi-square-gamma statistic and an expectation value of that chi-square-gamma value, and a standard deviation of that chi-square-gamma value, and stopping the iteration for the first iteration having a stop-criterion less than or equal to one.

5. The method of claim 1, further comprising setting the stop-criterion to be the value of the chi-square-gamma statistic, and stopping the iteration when the threshold, $\tau \leq E(\chi_\gamma^2) + n \cdot \sigma(\chi_\gamma^2)$ where $E(\chi_\gamma^2)$ is the expectation value of that chi-square-gamma value, n is an assigned factor and $\sigma(\chi_\gamma^2)$ is the standard deviation of that chi-square-gamma value.

6. The method of claim 1, further comprising calculating the value of the chi-square-gamma statistic to be a sum of ratios calculated over data points defining a data space, wherein for each data point a denominator of the ratio is a square of a modified residual, and the numerator of the ratio is the sum of a measured value of that data point and a statistical-data-offset number, and wherein the residual is the difference between a corrected measured value of that data point and a modeled value of that data point, wherein the corrected measured value is the sum of the measured value and the minimum of the measured value and one.

7. The method of claim 1, wherein a region of interest is defined within an object space, and further comprising calculating the chi-square-gamma statistic using a forward projection of the region of interest into a data space.

8. The method of claim 1, wherein the iteration step is an iteration step of an algorithm selected from the group consisting of algorithms based on maximum likelihood, algorithms based on an ordered subset expectation maximization, algorithms based on a non-negative least square fit, algorithms based on an ordered subset non-negative least square fit, and algorithms based on a pixon method.

9. A computer readable medium having included software thereon, the software including instructions to reconstruct a reconstruction image object, the instructions comprising:
   providing an initial image object representing radiation from a patient;
   reconstructing, in a series of iteration steps, updated image objects, wherein each iteration step includes determining a data model from an input image object, the input image object of a first iteration being the initial image object and the input image objects of subsequent iterations being the updated image objects from previous iterations, and determining a stop-criterion of the data model on the basis of a chi-square-gamma statistic;
   determining that the stop-criterion of the data model has transitioned from being outside a limitation of a preset threshold value to being inside the limitation, the stop-criterion or the threshold being a function of a statistical value of the chi-square gamma statistic, the stop-criterion or the threshold varying by spatial location and being weighted toward a region of interest within the volume;
   ending the iterations; and
   selecting one of the updated image objects to be the reconstructed image object.

10. A computer readable medium having included software thereon, the software including instructions to update an input image object, the instructions comprising:
   providing an initial image object representing radiation from a patient;
   reconstructing, in a series of iteration steps, updated image objects, wherein each iteration step includes determining a data model from an input image object, the input image object of a first iteration being the initial image object and the input image objects of subsequent iterations being the updated image objects from previous iterations, and determining a stop-criterion of the data model on the basis of a chi-square-gamma statistic;
   determining that the stop-criterion of the data model has remained outside a limitation of a threshold value, the stop-criterion or the threshold being a function of a statistical value of the chi-square gamma statistic, the stop-criterion or the threshold varying by spatial location and being weighted toward a region of interest within the volume; and
   providing the updated object of the iteration step as input image object of the next iteration.

* * * * *